(12) United States Patent
Kuffner et al.

(10) Patent No.: US 7,218,641 B2
(45) Date of Patent: May 15, 2007

(54) METHOD AND APPARATUS FOR ADAPTIVE PROCESSING GAIN FOR MULTIPLE SOURCE DEVICES IN A COMMUNICATIONS SYSTEM

(75) Inventors: Stephen Kuffner, Algonquin, IL (US); David P. Gurney, Carpentersville, IL (US)

(73) Assignee: Motorola, Inc., Schaumburg, IL (US)

( * ) Notice: Subject to any disclaimer, the term of this patent is extended or adjusted under 35 U.S.C. 154(b) by 428 days.

(21) Appl. No.: 10/385,886

(22) Filed: Mar. 11, 2003

(65) Prior Publication Data

US 2004/0179547 A1 Sep. 16, 2004

(51) Int. Cl.
*H04L 12/413* (2006.01)
*H04J 3/16* (2006.01)
*H04J 3/22* (2006.01)

(52) U.S. Cl. ........................ 370/445; 370/465
(58) Field of Classification Search ................ 370/431, 370/461–462, 203, 208–209, 465, 252, 445
See application file for complete search history.

(56) References Cited

U.S. PATENT DOCUMENTS

| | | | |
|---|---|---|---|
| 4,646,293 A * | 2/1987 | Okada et al. ................ 370/445 |
| 5,025,486 A * | 6/1991 | Klughart ..................... 340/3.1 |
| 5,210,771 A | 5/1993 | Schaeffer et al. |
| 5,294,931 A | 3/1994 | Meier |
| 5,488,631 A | 1/1996 | Gold et al. |
| 5,500,856 A | 3/1996 | Nagase et al. |
| 5,640,442 A | 6/1997 | Fitzgerald et al. |
| 5,737,358 A * | 4/1998 | Ritz et al. ................... 375/133 |
| 5,771,288 A | 6/1998 | Dent et al. |
| 5,844,509 A | 12/1998 | Behrens et al. |
| 5,859,839 A | 1/1999 | Ahlenius et al. |
| 5,883,582 A | 3/1999 | Bowers et al. |
| 5,986,570 A | 11/1999 | Black et al. |
| 6,034,603 A | 3/2000 | Steeves |
| 6,101,176 A | 8/2000 | Honkasalo et al. |
| 6,107,910 A | 8/2000 | Nysen et al. |
| 6,256,487 B1 | 7/2001 | Bruhn et al. |
| 6,260,171 B1 | 7/2001 | Gray |
| 6,265,962 B1 | 7/2001 | Black et al. |
| 6,275,478 B1 | 8/2001 | Tiedemann, Jr. |
| 6,285,887 B1 | 9/2001 | Mimura |
| 6,335,685 B1 | 1/2002 | Schrott et al. |
| 6,337,853 B1 * | 1/2002 | Piolini ........................ 370/329 |
| 6,354,493 B1 | 3/2002 | Mon |
| 6,377,203 B1 | 4/2002 | Doany |
| 6,385,264 B1 | 5/2002 | Terasawa et al. |
| 6,510,143 B1 | 1/2003 | Bejjani et al. |
| 6,539,003 B1 | 3/2003 | Agarioal et al. |
| 6,545,994 B2 | 4/2003 | Nelson, Jr. et al. |
| 6,654,375 B1 | 11/2003 | Vedder |
| 6,708,044 B1 | 3/2004 | Puknat et al. |

(Continued)

*Primary Examiner*—Kevin C. Harper
(74) *Attorney, Agent, or Firm*—Valerie M. Davis

(57) ABSTRACT

A method of dynamically adapting the number of available channels in a first set of available channels for use by at least one signal source in a communications system. The method includes the steps of computing at least one received signal statistic; determining an adjustment to the number of available channels in the first set based on the at least one computed received signal statistic; and signaling to each active signal source in the system to cause the signal sources to use the adjusted number of available channels for transmitting signals.

29 Claims, 21 Drawing Sheets

U.S. PATENT DOCUMENTS

| | | |
|---|---|---|
| 6,754,190 B2 | 6/2004 | Gurney et al. |
| 6,804,222 B1* | 10/2004 | Lin et al. ................... 370/338 |
| 2001/0033579 A1* | 10/2001 | Nelson et al. ............. 370/447 |
| 2002/0061008 A1* | 5/2002 | Lysejko et al. ............ 370/351 |
| 2002/0097681 A1* | 7/2002 | Treister et al. ............. 370/238 |
| 2002/0099854 A1* | 7/2002 | Jorgensen .................. 709/249 |
| 2003/0026283 A1* | 2/2003 | Currivan et al. ............ 370/441 |
| 2003/0164752 A1* | 9/2003 | Haimovitch et al. ..... 340/10.34 |
| 2004/0066752 A1 | 4/2004 | Hughes |
| 2004/0205191 A1 | 10/2004 | Smith |
| 2005/0117557 A1* | 6/2005 | Lakkis ....................... 370/338 |

* cited by examiner

| CHANNEL NUMBER | #0 | #1 | #2 | #3 | #4 | #5 | #6 | #7 |
|---|---|---|---|---|---|---|---|---|
| PASS #1 | ① | 2 6 | 4 8 | | ③ | ⑦ | ⑤ | |
| PASS #2 | 1 4 5 | 2 8 | | | 6 7 | | | 3 |
| PASS #3 | ② | | | 1 8 | 4 7 | | 3 | 5 6 |
| PASS #4 | | | 5 | 7 | ④ | ⑧ | 1 2 6 | 3 |
| PASS #5 | 1 | | 2 | 5 7 | 3 | 6 8 | 4 | |
| PASS #6 | | 4 8 | | 5 | 1 3 6 | 2 | 7 | |
| PASS #7 | | 3 4 8 | | 1 6 | 2 5 | | | 7 |
| PASS #8 | | 2 4 | ⑥ | | 5 7 8 | 1 3 | | |

LEGEND: CIRCLED ITEMS ARE NEWLY ID'd
SHADED ITEMS ARE PREVIOUSLY ID'd

*FIG. 21*

METHOD AND APPARATUS FOR ADAPTIVE PROCESSING GAIN FOR MULTIPLE SOURCE DEVICES IN A COMMUNICATIONS SYSTEM

REFERENCE TO RELATED APPLICATIONS

The present application is related to the following U.S. applications commonly owned together with this application by Motorola, Inc.:

Ser. No. 09/982,279, filed Oct. 17, 2001, titled "Collision Mitigation Methods used in a Communication System" by Kuffner, et al.

Ser. No. 09/981,031, filed Oct. 17, 2001, titled "Channel Selection Method used in a Communication System" by Gurney, et al., now U.S. Pat. No. 6,754,390;

Ser. No. 10/385,549 filed Mar. 11, 2003, titled "Method and Apparatus for Electronic Item Identification in a Communication System Using Known Source Parameters" by Kuffner, et al.; and Ser. No. 10/385,893, filed Mar. 11, 2003, titled "Method and Apparatus for Source Device Synchronization in a Communication System" by Kuffner, et al.

FIELD OF THE INVENTION

The present invention relates generally to a collision mitigation method used in a communication system.

BACKGROUND OF THE INVENTION

A fast, efficient and reliable means of communicating data in a multi-user system is desirable for many applications. A need for such methods arises when multiple pieces of data (from multiple sources) need to be quickly read by a receiver. One particular application of such technology is in the electronic identification of multiple items.

The electronic identification industry is important for numerous commercial and military applications, including real-time item tracking and inventory. Such uses can greatly increase operational efficiency in a myriad of scenarios, including virtually all of those involving some form of manufacturing, warehousing, distribution and retail. The ability to quickly and efficiently perform accurate real-time inventory tracking can greatly reduce waste in many forms, including, but not limited to, the misplacement of items, over- or under-stocking of items, and item theft.

Currently, the electronic identification industry relies heavily on manual (light-based) scanning to identify a plurality of items, where each item is assigned a product code. The Universal Product Code (UPC) system is currently in widespread use throughout the United States retail industry. Manually scanning items, however, is extremely time-consuming and highly prone to human error.

Thus, there exists a need to provide a method for fast, efficient and reliable transmission of data from multiple sources to a receiver. More specifically, there exists a need to read such data as quickly as possible for all possible operating cases in an RFID system. Such scenarios may include cases where the number of tags ranges from very low to very high, or cases where the communications channel conditions range from very poor to very good. There exists a need for a method to adapt the data transmission system to all of these cases, in order to increase system throughput and efficiency.

BRIEF DESCRIPTION OF THE FIGURES

The present invention is now described, by way of example only, with reference to the accompanying figures in which like references indicate similar elements and in which:

FIG. 21 illustrates an example inventory accounting with no collision mitigation techniques applied in accordance with the present invention;

DETAILED DESCRIPTION OF THE PRESENT INVENTION

The described system provides an improved communications method that allows multiple source devices to quickly and efficiently communicate information to a destination device. The described communications system employs a combination of several techniques to achieve superior performance over the prior art. The present invention allows a typical data gathering (or inventory reading data transmission) process to be significantly accelerated by adapting the system based on specific factors. These factors may include expected or determined tag populations, communications link quality indicators, and estimated system loading, as described below. Such information allows the destination (e.g., reader) device to direct all active sources (e.g., tags) to communicate over a reader-determined number of channels, enabling the destination device to optimize system performance (i.e., read transaction time) for a given set of operational variables.

The described system provides a means for UPC replacement, while adding additional features and benefits, such as the elimination of manual (light-based) scanning, and greatly increased scanning (or item identification) speeds. The present invention further provides for fast, simultaneous identification of numerous items, which is highly useful in many applications, such as managing inventory on store shelves, or the like. Often, the management of such information is more valuable when it is performed in real or near-real time. The present invention allows significantly faster data reading speeds (or higher system throughputs) to be obtained.

The preferred embodiment of the present invention utilizes adaptive algorithms in the destination device (or reader receiver) possibly along with knowledge gathered in past full read cycles to improve system performance. It also generally utilizes one-way communication (from the source device to the destination device) in order to simplify the circuitry on the source device; the source device does not require the use of a receiver.

The information communicated from the source device to the destination device typically takes the form of binary electronic product codes ("EPC") or identification ("ID") information, though it is not limited in any manner to these forms of information. Communicating other types of information, such as electronic telemetry (or any other type of measured or assigned data) is also possible. In fact, any information that has a representation in a binary (or other) number format can be communicated with the described system.

Figure 1:
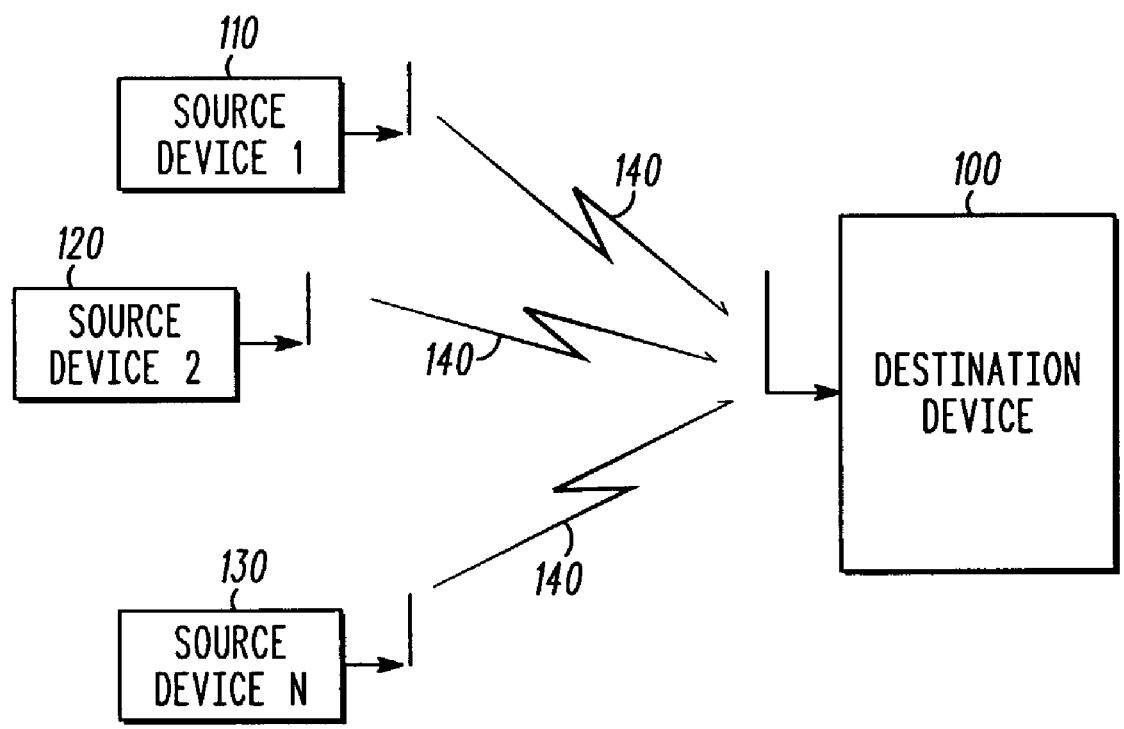
FIG. 1 illustrates a high-level view of multiple source devices communicating with a single destination device in accordance with the invention.

As illustrated in FIG. 1, the information is typically communicated from a set of source devices 110, 120, 130 to a single destination device 100; the preferred embodiment of the present invention utilizes simultaneous communication of information from the set of source devices 110, 120, 130 to the destination device 100. Since the present invention has numerous applications, depending on the context of the example, some terms used throughout the discussion are interchangeable with other terms for ease of clarification. Thus, it should be noted that the following terms are used interchangeably throughout the following discussion without loss of generality: source device, transponder, user, item, tag, or the like; it should also be noted that the following terms are used interchangeably throughout the following discussion without loss of generality: destination device, system controller, interrogator, reader, receiver, or the like.

The communication system employed by the present invention can encompass several different forms of communication 140, including, but not limited to, optical communication, radio frequency (RF) communication, wired (contacted) communication, sound-wave communication, capacitively coupled communication, or inductively coupled communication. The preferred embodiment of the present invention utilizes a capacitively coupled communication link between the tags 110, 120, 130 and the reader 100, though other forms of communications links may be utilized without limitation.

The following description of the invention is divided into several background sections (I–II) describing many important aspects of the system, and latter sections (III–V) providing detailed descriptions of the present invention. The preferred embodiment of the system utilizes all of the key techniques described below, though other embodiments may utilize only a subset of the described techniques.

I. Data Scrambling and Descrambling

Figure 2:
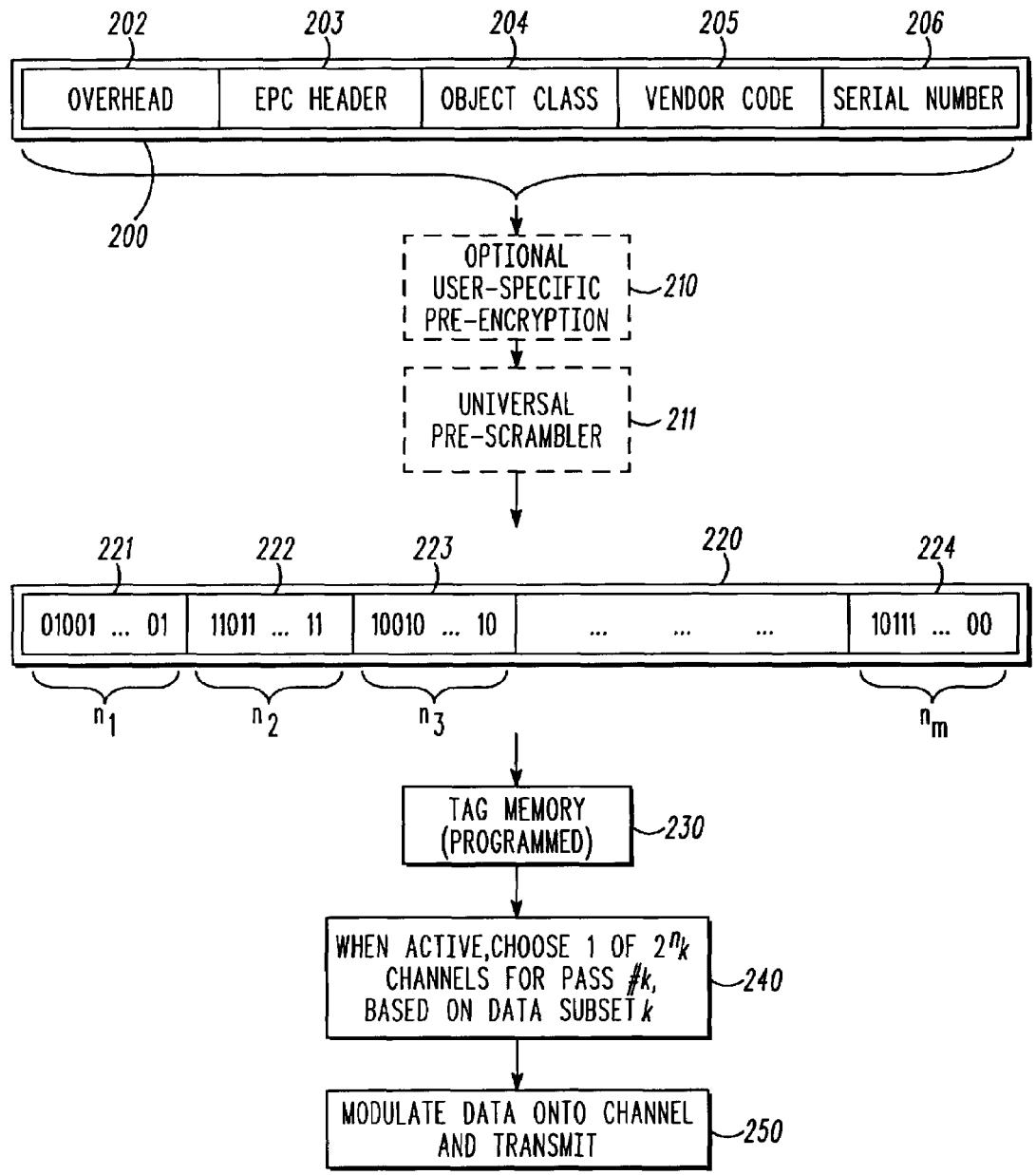
FIG. 2 illustrates how data stored on a tag is altered and used to determine communications channels while operating in accordance with the invention.

As shown in FIG. 2, the data 200 that is communicated by the tag 110 to the reader 100 in the described system can take many forms, including, but not limited to, measured or other user defined data as described below. In the preferred embodiment of the present invention, the communicated data 200 consists of at least an identification data sequence. For example, the data 200 may consist of at least an EPC having 96-bits of identification data as outlined by David L. Brock in "The Electronic Product Code," MIT-Auto ID Center, January 2001. The EPC 200 serves to uniquely identify each tag (or item) 110 in the system, by reserving fields for a header 203, object class 204, vendor code 205, and serial number 206. Note, for example, that 96 bits of information provides for a huge number of unique IDs ($2^{96} \sim 8 \times 10^{28}$; as an indication of the enormity of this number, the mass of the earth is $6 \times 10^{27}$ grams).

Additional information 202 is typically appended to the stored data 200 on the tag 110 in the preferred embodiment, such as user information, error checking or correction information (e.g., forward error correction (FEC), cyclic redundancy checks (CRCs), etc.), and other reserved bits. Note that the additional information (e.g., error detection or/correction data) may be appended either before or after the data scrambling process described below, though it is desirable that if this additional information is appended after the data scrambling that it also has uniformly random properties.

Those skilled in the art recognize that several different additional forms of information (e.g., programmable timestamps, other user personal identification numbers (PINs), measured data, environment data, etc.) may also be predetermined and stored on the tags 110, 120, 130. Note that there are no limitations placed on the amount or type of data stored on the tags 110, 120, 130 in the described system.

All of the tag functions are typically implemented in low complexity (i.e., low cost) circuitry. In order to keep the circuitry on the tag 110 simple, and to improve performance of the channel selection process in the system (as fully described below), it is highly desirable to scramble the original ID data 200 prior to its being stored on the tag 110. This is typically accomplished through a randomization or scrambling process 211 that is carried out before the operation of storing data 230 on the tag 110.

This scrambling algorithm 211 is typically applied universally throughout the system in order to assure that the EPC data 200, after being scrambled 220, exhibits desirable statistical (i.e., uniform and random) properties. Alternatively, in other embodiments, some other scrambling, encryption, or numbering assignment algorithm may be applied to the stored data 200 in order to effectively create the scrambled data 220. To gain additional information privacy, individual vendors may optionally apply pre-encryption 210.

Figure 3:
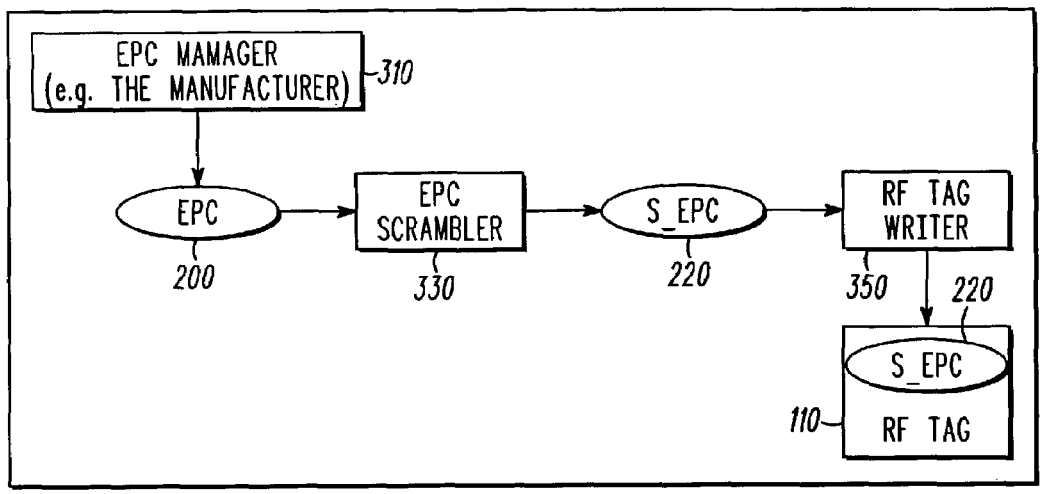
FIG. 3 illustrates a high-level view of the process used to scramble the stored data on a tag in accordance with the invention.

FIG. 3 illustrates an example of the system for embedding scrambled data 220 into the tag 110 in accordance with the preferred embodiment of the described system. In FIG. 3, the original EPC 200 is obtained in the usual manner from the EPC manager 310, such as the manufacturer. The EPC 200 is then input into a scrambler 330 that performs a scrambling algorithm and output the scrambled data (S_EPC) 220. A RF tag programmer/writer 350 then embeds the scrambled data, S_EPC, 220 into the tag 110. The scrambled data 220, which is a modified version of the original data 200, now resides inside the tag 110.

Figure 4:
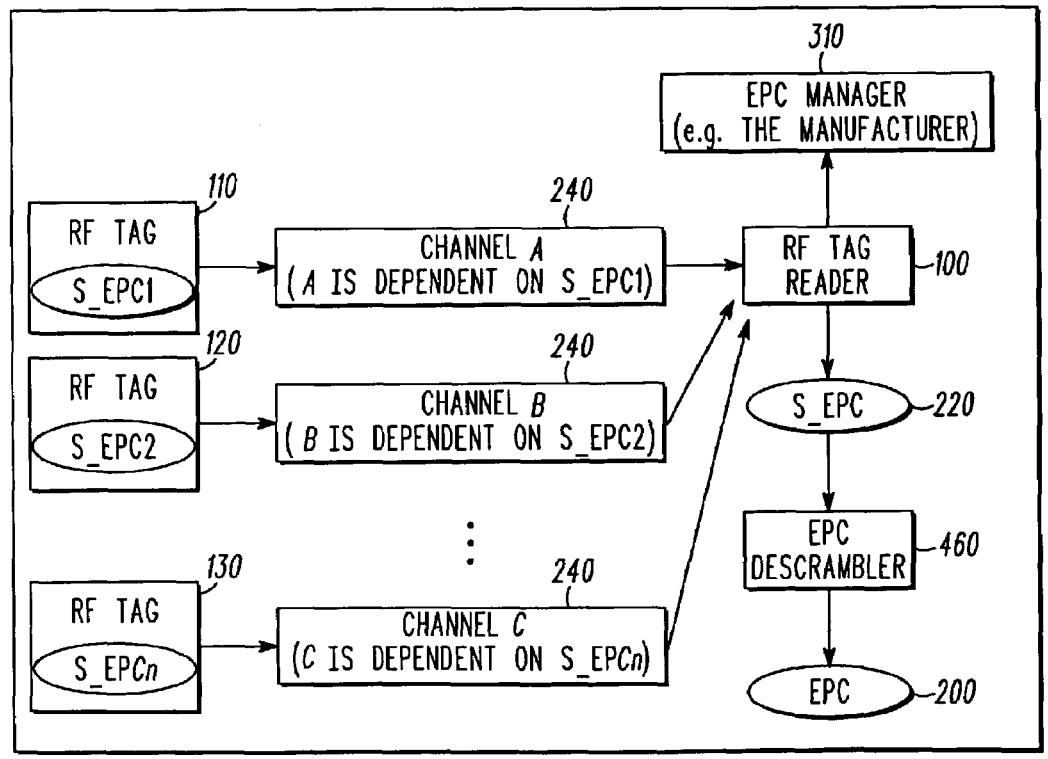
FIG. 4 illustrates a high-level system view of multiple tag communications and the scrambling reversal (descrambling method) performed in the reader in accordance with the invention.

FIG. 4 illustrates a high-level block diagram for simultaneously reading electronic identification data 200 from many RF tag devices 110, 120, 130. This example illustrates how the tags associated with products residing on a shelf might be read during a typical inventory count. In operation, the reader 100 simultaneously activates a set of tags 110, 120, 130. The activated tags 110, 120, 130 then proceed with a multiple-pass transmission algorithm using the scrambled tag data 220 as a basis for channel selection (described in detail below in Section III).

For example, in a first pass of the multiple-pass algorithm, at least a portion of S_EPC1 (which is embedded in tag 110) is used to select Channel A 240, at least a portion of $S_{13}$ EPC2 is used to select Channel B 240, and at least a portion of S_EPCn is used to select Channel C 240. It should be noted that channels A, B and C, or any combination thereof, can be the same or different. The reader 100 proceeds with its demodulation algorithm, and eventually obtains the S_EPCs 220 for the tags 110, 120, 130 on the shelf. The S_EPCs 220 are routed into a descrambler 460 that performs a descrambling algorithm to obtain the original EPC data 200 of the tags 110, 120, 130. The EPC data 200 corresponding to each tag can then be kept in the reader 100 or sent back to the original EPC manager 310 (e.g., the manufacturer) in the form of an inventory report. Those skilled in the art recognize that the descrambling operation may be performed at other locations, such as a remotely located computer or an on-line server. Collisions in the system of FIG. 4 are minimized because, instead of the highly structured EPC data 200, the tags 110, 120, 130 use at least a portion of the scrambled versions of the EPC data 220 to select a channel during each pass of the multiple-pass transmission algorithm. This scrambled data 220 very closely resembles uniformly distributed data, thus collisions between products with similar EPC data 200 are minimized. For more on multiple-pass transmission algorithms and channel selections, see Section III below; for more on collisions and collision resistance, see Section V below.

No information is exchanged between the tag 110 and the reader 100 before the tag 110 needs to select a channel to use for transmission (as described below). Thus, the scrambling and de-scrambling methods in the described system must be self-referential only; that is, the only information needed to scramble the EPC 200 or descramble the S_EPC 220 is the data itself.

The system described calls for the use of a scrambling method that possesses certain key properties. An important property is that the scrambling method maps typical data sequences (such as EPC data sequences) to results that exhibit properties of a uniform random distribution. In the preferred embodiment, the scrambling method has two main properties:

1. Given two typical EPCs 200 represented with k-ary digits, where k is a predetermined integer (e.g., in a typical pair of EPCs 200 many, but not all, of the k-ary digits are the same), the probability that the scrambled S_EPCs 220 corresponding to these EPCs 200 match for n consecutive k-ary digits (used by the tag 110 to determine channel assignments) is approximately $1/k^n$; and 2. Given two typical EPCs 200 represented with k-ary digits, where k is a predetermined integer (e.g., in a typical pair of EPCs 200 many, but not all, of the k-ary digits are the same) whose scrambled outputs match for n consecutive k-ary digits (used by the tag 110 to determine channel assignments), the subsequent m k-ary digits (used by the tag 110 to determine subsequent channel assignments) will match with probability approximately $1/k^m$.

In the example of a binary represented EPC 200, these properties are related to a strong avalanche property whereby each output bit is dependent on every input bit and changing a single input bit, changes half of the output bits on average.

In addition to the scrambling process described above, the data 200 may also be encrypted 210 before or after applying the universal scrambling algorithm (e.g., prior to, programming the tag 110) to assure further data security. There are a variety of known encryption algorithms (e.g., AES, Data Encryption Standard, International Data Encryption Algorithm, etc.) in the art that may be utilized for this task. The availability of this additional level of security is important for high-privacy applications (such as those where tags may contain sensitive medical or financial data).

II. Power-On Methods

Figure 7:
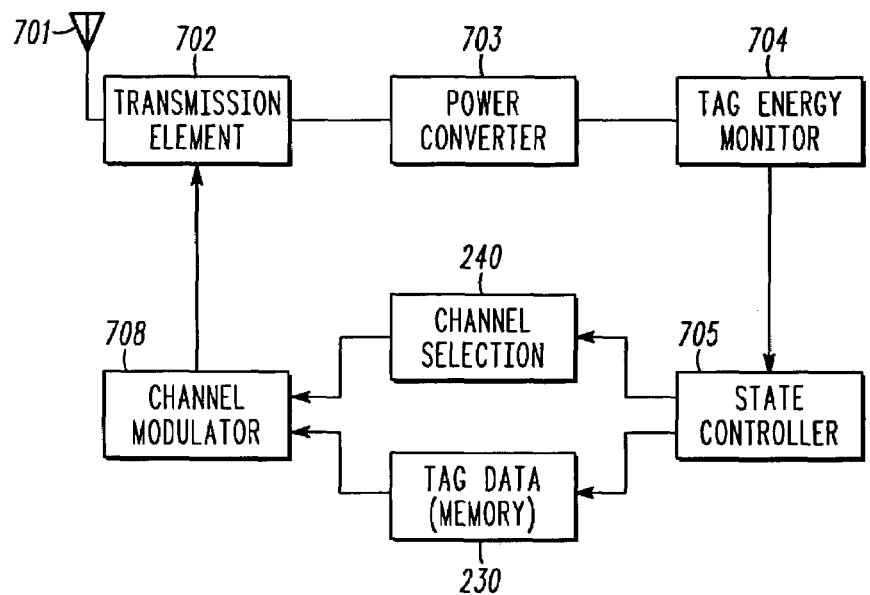
FIG. 7 illustrates a high-level block diagram of a tag in accordance with the invention.

A block diagram of a tag 110 in the spirit of the preferred embodiment is illustrated in FIG. 7. For a capacitively coupled system, the antenna 701 is a pair of conductive electrodes (e.g., capacitive plates), but in general can be any method of coupling energy from an electromagnetic field into a circuit. The alternating current ("AC") power from the reader 100 that is coupled into the tag 110 is rectified in power converter 703, the direct current ("DC") output of which is used to power the tag 110 and also serve as a tag energy monitor 704 which further enables communications (the elements of which will be discussed in more detail below). The state controller 705 acts on the tag data 220 and the communications channel selection block 240 to produce transmit signal information, which is when applied to the transmission element 702 (such as a load modulation element that is well understood in the art) under the control of the channel modulator 708 results in the generation of a signal source transmission from tag to reader. Synchronization and adaptation takes place in block 704 and 705 as further described below. Block 704 may be configured to sense the adjustment signaling from the reader device, and block 705 (in conjunction with block 240) may be utilized to enact the change to the number of available channels in the system.

Figure 8:
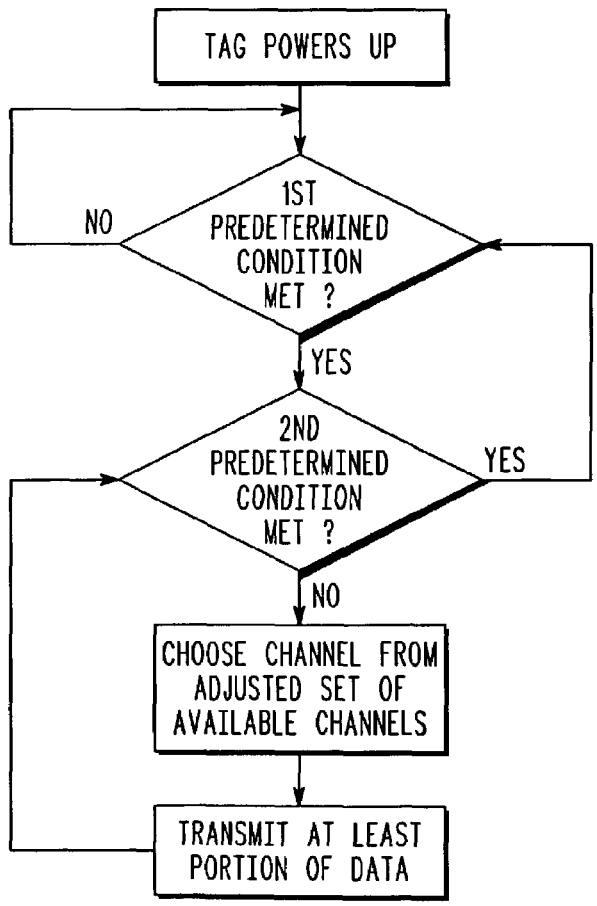
FIG. 8 illustrates a general flowchart outlining tag transmission conditions in accordance with the invention.

The data 220 stored on each tag 110 is typically stored in low complexity (i.e., low cost) circuitry, which then responds to inquiries from the reader 100. Each tag 110, 120, 130 typically waits for a first predetermined condition to be met before transmitting its information in a multiple pass algorithm. The first predetermined condition is typically set to be the same for each of the tags 110, 120, 130, though it could be randomly chosen or assigned in other embodiments. An example of a general flowchart showing tag transmission conditions is shown in FIG. 8. Note that in this flowchart, the second predetermined condition may be met by a variety of measures (e.g., when a first predetermined condition is no longer met or a second predetermined condition is met).

Figure 9:
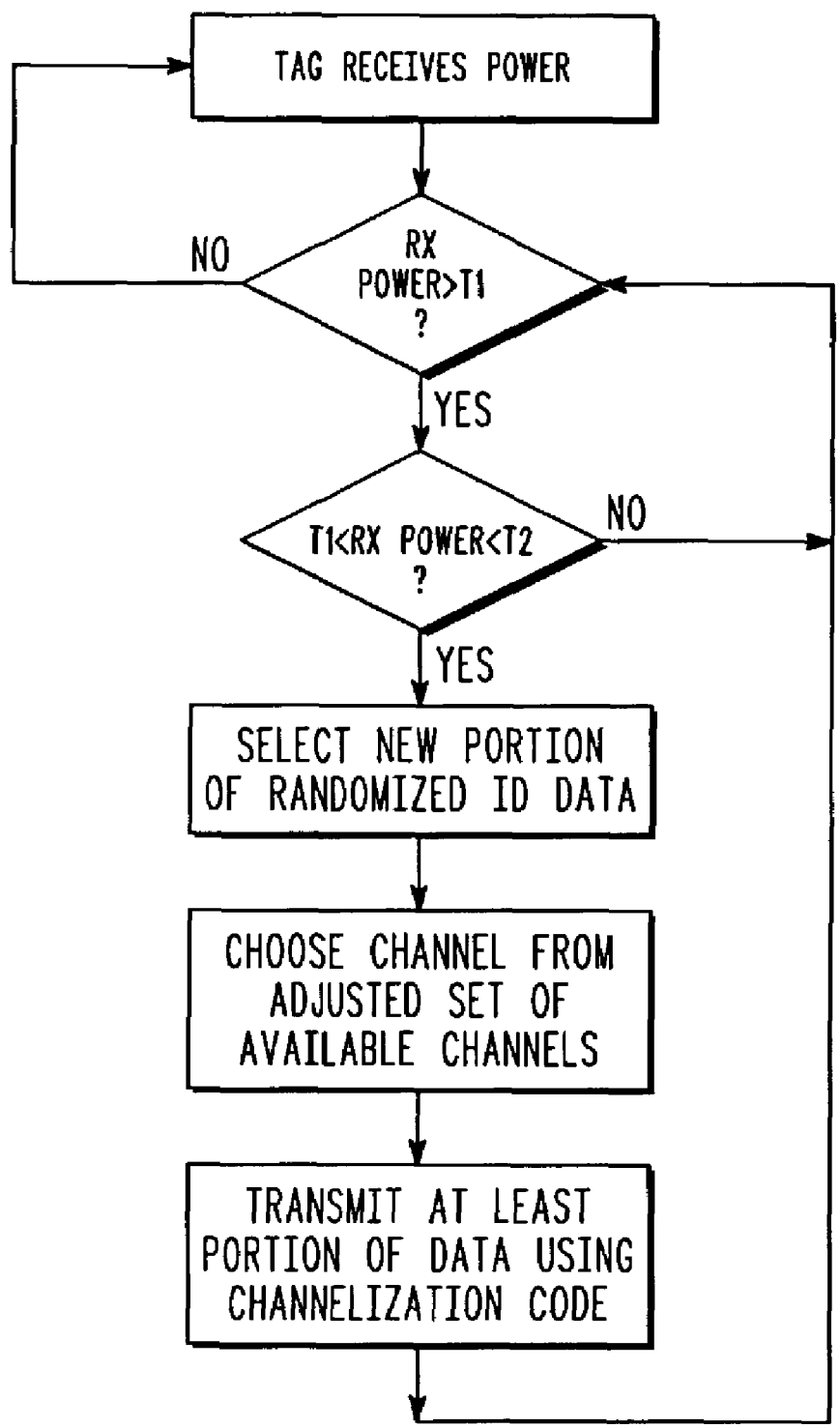
FIG. 9 illustrates a detailed flowchart outlining tag transmission conditions in accordance with the invention.

In the preferred embodiment, the reader 100 remotely powers the tags 110, 120, 130, and the first predetermined transmission condition is met when the instantaneous received power level at the tag 110 exceeds a predetermined threshold (that is generally determined by 703 and 704). FIG. 9 illustrates a flowchart of this action, where T1 and T2 represent a first and second power level threshold. Note that implementations employing other predetermined conditions (such as, particular synchronization pulses or pseudo-random pauses) can be employed by those skilled in the art without departing from the spirit of the described system. Once the tag 110 receives power (either remotely from the reader 100 for a passive tag, or self-powered for an active tag), the tag 110 continuously monitors the received signal strength to determine when to begin transmitting. Once the tag 110 begins modulation and transmission 250 of its data, it is fully activated. Note that multiple tags 110, 120, 130 will typically be fully activated at a given time in the preferred embodiment of the system.

The fully activated tags in a group will continue to transmit their information in multiple passes (fully described below) until a second predetermined transmission condition is met, at which time they will stop transmitting data. The second predetermined transmission condition in the preferred embodiment is met when the received power level at the tag 110, as observed by tag energy monitor 704, either falls below the first predetermined threshold or exceeds a second predetermined threshold, which is typically set higher than the first predetermined threshold.

In this manner, the first and second predetermined transmission conditions form a range of received power levels (e.g., a window) over which each group of tags is typically fully activated. In the preferred embodiment of the described system, the power-on range is typically about 3 dB wide, meaning that tags 110, 120, 130 will respond to power in a range of 1–2X (relative to some normalized received operational power level). Note that this powering window generally causes the tag's transmissions to fall within a proportionally narrow power window, which helps alleviate the typical near-far problem that affects some communications systems (e.g., as in spread spectrum systems with non-orthogonal spreading codes).

All of the tags 110, 120, 130 in the system are typically assigned the same power-on range in the preferred embodiment, although other embodiments are possible, such as those that utilize programmable (e.g., pre-assigned, but likely different) or random power-on conditions. One such example may occur when different manufacturers are assigned different power-on range levels, providing some separation (or distinction) between different manufacturer's products. For the purposes of the present invention, any tag that is transmitting data (as determined by the above or other conditions) is considered to be an active transmitter.

In yet other embodiments of the described system, tags with two-way communication abilities may exist, in which case the first and second predetermined transmission conditions may consist of some type of synchronization pulses or other signaling information. In the case where the predetermined transmission conditions are random, they may be randomly determined on the tag 110, or during programming of the tag 110. Note once again that other implementations of these transmission controls (e.g., synchronization signals, two-way communication with the tag, etc.) are possible without departing from the spirit of the system.

Figure 10:
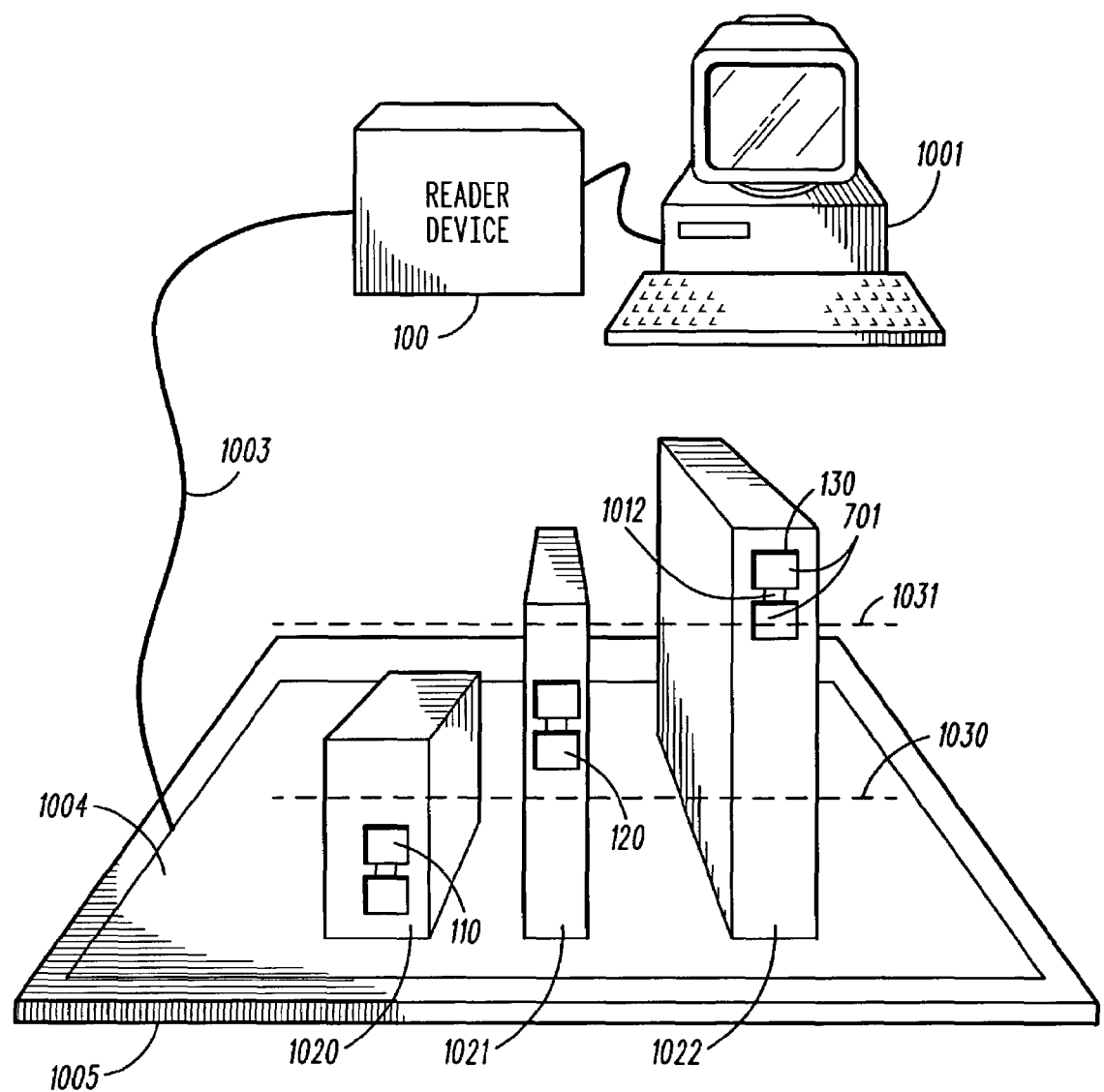
FIG. 10 illustrates an application using capacitive coupling between the reader and a variety of tags in a typical embodiment in accordance with the invention.

In an example embodiment illustrated in FIG. 10, the reader 100, which may be remotely controlled from a head office by controller 1001, is connected via a transmission medium 1003 to an antenna 1004 mounted on a shelf 1005. Objects 1020, 1021, 1022, of varying physical dimensions, have tags 110, 120, 130 located on different parts of the packages, and result in variations in coupling between the antenna 1004 associated with the reader 100 and the antenna 701 associated with the tags 110, 120, 130, further resulting in different received power levels by tag electronics 1012. Due to different coupling characteristics between the reader antenna 1004 and various tags 110, 120, 130 in the system, different tags may receive different power levels (demonstrated by the range boundary lines 1030 and 1031) for a given reader antenna excitation level (i.e., reader transmit power level). This effect also serves as a coarse population reduction of the tags present in the system in the preferred embodiment, since it is likely that various tags 110, 120, 130 will begin transmitting at different reader transmit power levels and hence different times. Note, however, that multiple tags 110, 120, 130 will still typically begin transmission simultaneously for a particular power level in the preferred embodiment of the described system. For example, there may be one thousand items (tags) in an inventory that need to be identified, and the reader 100 may step through ten different possible power levels, activating groups of roughly one hundred tags at each power level (though fewer tags will likely be activated at the extreme upper and lower power levels). In other embodiments of the system, transmissions from multiple tags may only be synchronized (though not necessarily simultaneous), such as in the case of time-slotted (channelization) systems, where users choose a particular time slot (relative to a common reference) to transmit on. Note that in one embodiment, the reader 100 will step through all possible transmit power levels, starting with the lowest transmit power level. Thus, due to the particular power-on ranges of the tags 110, 120, 130, the reader 100 effectively controls when each group of tags begins and ends transmissions. This aspect is important since the reader 100 determines when all of the tags 110, 120, 130 in a particular power-on range (e.g., between 1030 and 1031) have been uniquely identified, at which time it can step to the next power level (e.g., above 1031) or terminate the identification process.

In another embodiment, the reader 100 may 'learn' or remember a range of expected power levels for a given inventory profile, and arrange its power sweep with priority given to those power levels with a history of activity. When the reader 100 steps to a power level where no tags are activated, it senses that condition (typically through a short energy or modulation detection measurement), and quickly steps to the next power level, so as to minimize the total reading time of the tags, as further described below.

III. Channel Selection and Transmission Methods

All multiple source (or multi-user) communications methods use some type of channelization method, as does the present invention. It is possible to utilize any one of several channelization methods or techniques in the described system. Generally, the channelization methods utilized can be divided into two categories: orthogonal channelization methods or quasi-orthogonal channelization methods. The present invention relies on the fact that system operation (i.e., the number of available channels) can be optimized for a given number of active tags and communications channel conditions.

Orthogonal communications channels have the advantage that communication on a chosen channel does not interfere (at all) with communication on other channels in a linear system (i.e., the cross-correlation over a symbol time between different channels is defined as zero). Quasi-orthogonal channels are nearly orthogonal (e.g., having a cross-correlation value near zero for different channels), and are typically utilized in direct-sequence code division multiple access (DS-CDMA) systems, where each user is typically assigned a different spreading code.

It is well known in the art that different phases (i.e., time shifts) of a maximal length linear feedback shift register ("LFSR") sequence (i.e., an m-sequence) are known to have low (i.e., quasi-orthogonal) cross-correlation properties. The cross correlation value of two unaligned sequences is defined to be $-1/N$ (normalized), where N is the length of the LFSR pseudonoise ("PN") sequence. Different code phases of the same base m-sequence are often used to channelize different users in a code-division multiple access system. Each symbol or bit in the PN sequence is typically referred to as a 'chip', as is well known in the art.

Some examples of orthogonal channelizing functions include, but are not limited to, Walsh functions, timeslots in a slotted system, frequencies in a frequency division system, specially augmented PN codes, etc. Some examples of quasi-orthogonal channelizing functions include m-sequences or PN sequences as described above.

Figure 11:
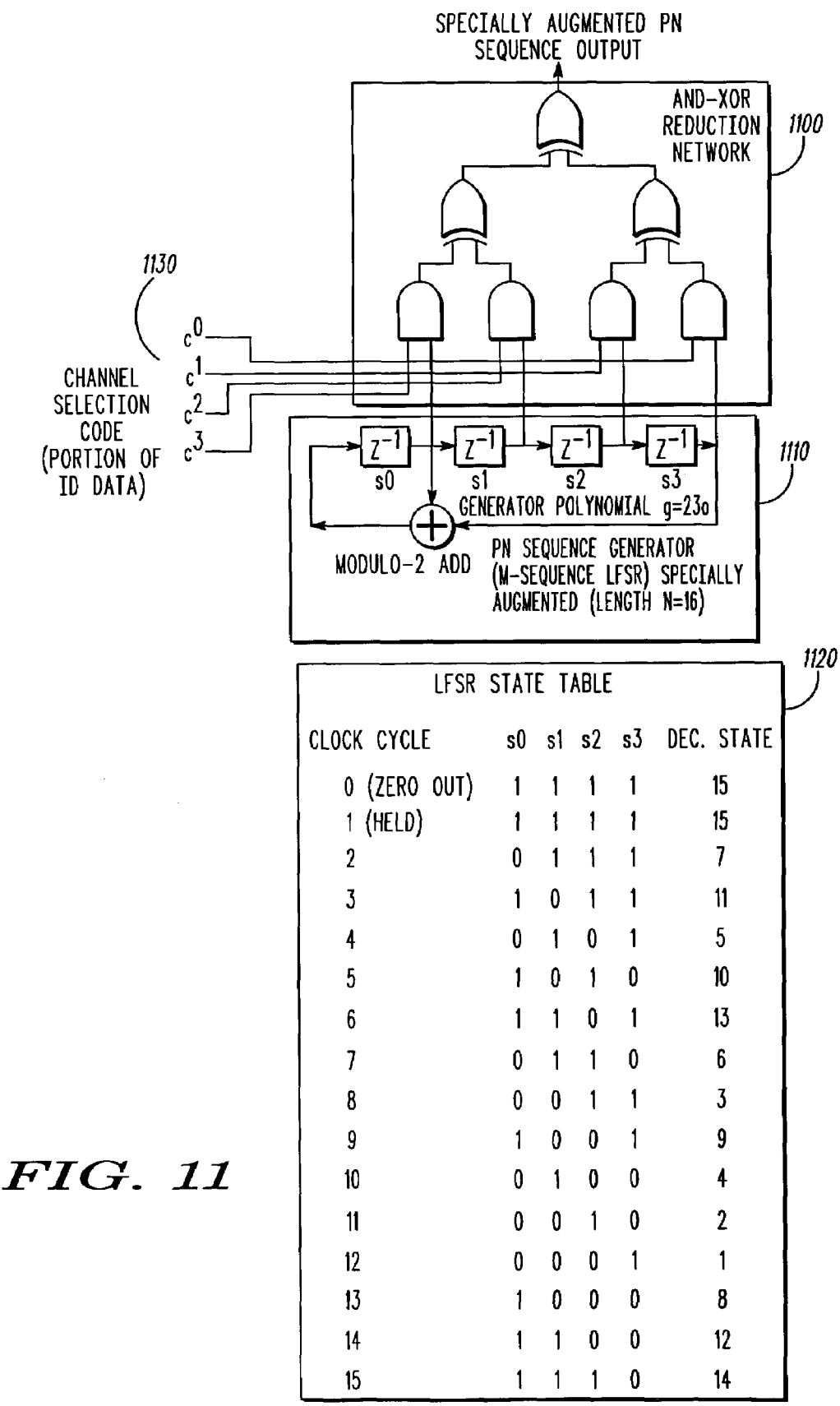
FIG. 11 illustrates a method of generating a channel for the tag to communicate over based on the data stored on the tag in accordance with the invention.

An example of a specially augmented PN code is one that has an artificially inserted (i.e., not generated by the normal operation of the LFSR) binary zero into the sequence (at different points in the sequence depending on the code phase), such that the time-aligned (i.e., synchronized) artificially inserted zero occurs at the same time offset on each channel, resulting in a zero cross-correlation value between different code phases of the same m-sequence. Note that the preferred embodiment of the present invention utilizes these specially augmented m-sequences (whose generation is shown in FIG. 11) to obtain orthogonal code channels in the synchronized system. As an added benefit of the employed spread spectrum techniques, resistance to interference (also called processing or spreading gain) is also achieved, as is well known in the art of communications. The application of such techniques is important for harsh electromagnetic environments, such as factory settings.

As referenced above, the tags 110, 120, 130 in the described system transmit their data using a multiple pass transmission algorithm. The multiple pass transmission algorithm is critical in determining the total reading time of the tags 110, 120, 130, and consists of several different aspects. The general idea employed in the algorithm is that each tag 110, 120, 130 will choose a particular (preferably a uniform random) channel for communications in each algorithm pass.

In the preferred embodiment of the described system, the channel selection 240 is typically based directly on the data 220 stored on the tag 110. The tag 110 will then typically transmit its information (i.e., identification data) in the preferred embodiment on the chosen channel, until the next pass of the algorithm, at which time it will choose a new channel and repeat the process. The transmissions of the tags are assumed to be roughly synchronized (by virtue of the first predetermined transmission condition) in the preferred embodiment of the invention.

The channel selections by each of the tags are based upon predetermined information (i.e., determined either at tag programming 230 in typical embodiments, actual data gathered by the tag, or possibly in the design of the tag itself). In the preferred embodiment of the present invention, the channel selections of each tag 110 are determined (in an algorithmic manner) directly from the identification data 220 that is stored on the tag 110 (as further described below). Also note that in other embodiments, the predetermined information above can include pseudo-randomly generated numbers not directly based on the data stored on the tag 110.

As fully described in Section I above, and a key for good system performance, the preferred embodiment of the described system requires that at least a portion of the data 200 (e.g., EPC, CRC, etc.) be pre-randomized (or scrambled) 211 before storing it 230 on the tag 110. Since the tag 110 essentially uses the stored data 220, or a portion thereof (e.g., 221, 222) to select 240 a communications channel in each pass of the multiple pass algorithm, it is crucial that the data 220 appear to be uniformly random for the best overall system performance. This is accomplished through a low complexity reversible scrambling algorithm 211 that is described in Section I above.

Figure 12:
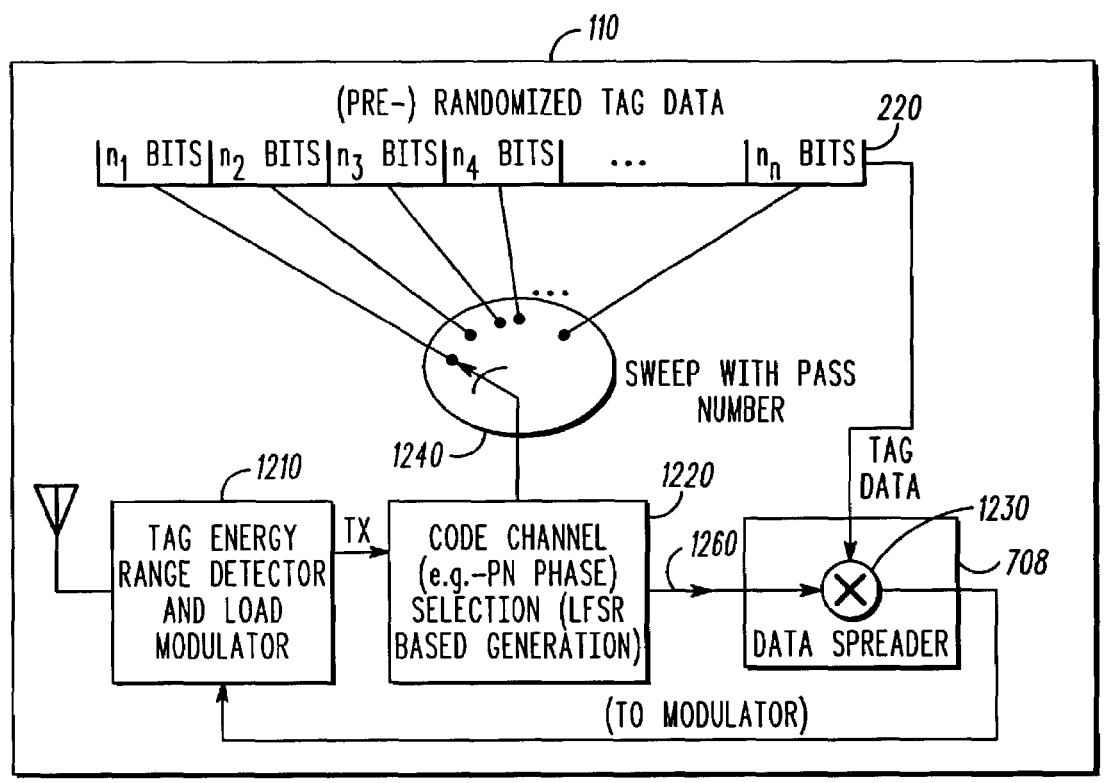
FIG. 12 illustrates a simplified tag circuitry functional block diagram highlighting the pass dependence and modulation method in accordance with the invention.

In particular, as illustrated in FIG. 12, the channel selection process 240 in each of the multiple transmission passes in the preferred embodiment is carried out by utilizing a predetermined subset (e.g., 221, 222, 223, 224) of the pre-scrambled (i.e., randomized and stored) data 220 to select the communications channel 240 in each pass. A channel selector 1220, such as a commutator or multiplexing device 1240, typically selects a channel. A new subset 221, 222, 223, 224 (i.e., a new random number draw) of the data stored on the tag 220 is typically utilized for channel selection in each subsequent pass of the algorithm, ensuring a random and independent selection of channels throughout the multiple pass transmission algorithm. When any adjustments are dynamically made to the number of available channels, block 240 may select the next n-bits of the stored data to choose the next channel, as further described below. The option of cyclically extending the stored data can be employed without limit when selecting more than the stored amount of data on the tag.

Note that the tag 110 may transmit all of its data 220 in each algorithm pass (as in the preferred embodiment), or only a portion of the data (i.e., generally enough data is transmitted to determine the channel utilized by the tag in the next pass). Typically, the portions 221, 222, 223, 224 of the data that are utilized for the channel selection in each pass of the algorithm are unique and contiguous sections of the data 220, preferably pre-randomized, though these conditions are not strictly required. A particular selection of channels for passes of the multiple pass transmission algorithm is termed a 'channel selection profile'.

For example, in a system with 128 bits of pre-scrambled identification data 220 stored on each tag, unique but sequential sections of 8 bits may be utilized to choose one of 256 (i.e., $2^8$) channels in each of 16 (i.e., 128/8) algorithm passes. Thus, the first randomized byte of data (e.g., 221) for each tag chooses 240 the communications channel for each tag, respectively, on the first pass of the algorithm, the second (and hopefully different) byte (e.g., 222) of randomized data for each tag is used to choose 240 the channel for transmission on the second pass of the algorithm, and so on. This multiple transmission pass process continues until all of the data stored on the tag is exhausted (e.g., the 16th pass is completed in this example; in FIG. 2, this would correspond to 224), or the reader 100 signals the tags to stop transmitting (generally sensed in the tag 110 by the second predetermined condition being met in 704 (1210) as described above). Once the data is exhausted, the whole process may optionally be repeated, though the tags will typically choose the same (deterministic) channels. Note once again it is desirable to choose a random and uniquely determined channel for each algorithm pass for each tag in order to randomize the collisions that will inevitably occur (see further details in Section V below).

Of course, those skilled in the art recognize that other (e.g., non-contiguous or not completely unique) sections of the data may be used to either directly or indirectly select the communications channel in each pass. In this manner, it is possible to extend the maximum number of algorithm passes before the channel choices repeat, virtually without limit. The channel selection profile (or channel choice algorithm) may be modified after some number of transmission passes, such that a different subset of the same data 220 is utilized for later channel selections 1220 (in order to extend the unique channel choices before any repetition of the pattern occurs). For instance, after 16 passes of the multiple pass transmission algorithm, the tags may shift the channel selection data (i.e., the predetermined data) by n-bits (where n=1.8 for the above example) to arrive at new channel selections for subsequent passes of the algorithm. In this manner, it is possible to extend the number of unique channel choices practically without limit, though the tag circuitry complexity is increased.

Yet other embodiments of the channel selection algorithm may also apply some type of mapping (generally one-to-one look-up table, or other algebraic or logic) function to determine the channel choices from the (generally limited) data stored or programmed on the tag. The only key characteristic of the channel selection process is that the channel choice be computable in the reader 100 once some portion of information is known about the data in the tag.

Since the channel resources are limited (i.e., there are a limited number of available channels for each user to select in each pass of the multiple pass communications algorithm), there will inevitably be collisions among the transmitting tags. A collision is defined as the case where two or more tags choose to communicate on the same channel during a particular algorithm pass. This situation is to be expected under normal system operation. For example, for a typical case of twenty-five tags communicating over 64 channels, the probability that there is at least one collision is 99.6% per pass. This is based on the fact that, for M tags communicating over N channels, the expression for the probability of no collisions is $$Pr\{\text{no collision}\} = \frac{N!}{(N-M)!} \cdot \frac{1}{N^M}$$

Several numerical examples of colliding tag transmissions and their remedies are discussed below in Section V—Collision Mitigation Methods.

In many cases, the number of tags present in the system (at a particular power-on level) may even exceed the number of available channels (especially on earlier passes of the preferred embodiment algorithm, or when the number of available channels is set low as described below). This situation is completely acceptable in the present invention when orthogonal channelization means are utilized. Note that typical DS-CDMA systems (using quasi-orthogonal channelization codes) would be considered overloaded at that point, and reliable communication could not take place (especially without further knowledge of the tags' transmission characteristics). Importantly, in the described system, the activated tag population can effectively be further reduced by collision mitigation techniques, which are fully described in Section V below.

Also importantly, the preferred embodiment of the described system utilizes a variable number of channels per pass (generally determined by 221, 222, . . . 224) of the multiple pass transmission algorithm in order to improve overall system performance (e.g., total reading time, total system capacity, reliability, etc.). In other words, the number of available channels in one pass of the multiple spass transmission algorithm could be different from the number of channels available in another pass of the transmission algorithm. The variable number of channels per algorithm pass (i.e., per unit time) is also termed a dynamic channel profile in the present discussion, since the number of available channels changes dynamically with time. Implementing the dynamic channel profile essentially optimizes the total transmission time (or total reading time) for one or more expected tag populations.

Note that the transmission time for each pass of the algorithm is typically proportional to the number of channels available for that pass of the algorithm (regardless of the channelization method that is utilized). The total transmission time ($T_{TX}$) for the multiple pass transmission algorithm can be expressed as $$T_{TX} = \frac{1}{R} \sum_{i=1}^{L} N_i * B_i$$

where L is the number of transmission passes that are required to successfully transmit the data, R is the transmission (signaling or channel symbol) rate, $B_i$ is the number of data symbols that are transmitted per pass, and $N_i$ is the number of channels available (or spreading gain) in the $i^{th}$ pass of the algorithm. Note that in one embodiment of the described system, L can be equal to 16 passes (allowed), $B_i$ is fixed at 128 bits, R is equal to 62.5 KHz, and the particular $N_i$ values are given in the example above, though this is only one particular embodiment of the system. Many other signaling rates and data formats are possible, as are many different carrier frequencies for transmitting the information. Recall that the number of channels available per pass ($N_i$) generally depends on the number of bits utilized to select a communications channel in each pass ($n_i$) as follows (as also shown in 240):

$$N_i = 2^{n_i}$$

In the preferred embodiment of the system, $N_i$ represents the spreading gain (or processing gain) and number of available code phases (channels) per pass, and R is the signaling rate in chips per second. Note that not all possible channels need to be utilized in a given transmission pass, though it is desirable to make all channels available for data transmission. The application of advanced collision mitigation techniques (described in Section V below) can greatly reduce the required number (L) of transmission passes from the tags 110, 120, 130. In general, there are no restrictions on any of the values in the above equation in other embodiments of the described system.

Since the transmission time per pass is dependent on the number of channels per pass (and the symbol rate) in the preferred embodiment as shown above, the system's total reading (i.e., acquisition) time performance can be improved for a small number of tags by using a smaller number of channels in earlier passes of the multiple pass transmission algorithm (since adding more channels to the system in such a case would be of little additional benefit for small numbers of tags). The number of channels may be increased in later passes of the algorithm (potentially in multiple steps) to accommodate cases where larger numbers of tags are present in the system, or cases where the communications channel is poor, and the reader 100 does not employ the more sophisticated signal processing (e.g., advanced collision mitigation) techniques referenced in Section V below. Increasing the spreading gain increases the system's immunity to other noise or interference sources, which also increases system robustness (allowing it to operate successfully under a variety of communications channel conditions).

In this manner, systems with a small number of tags present would typically not be penalized by the longer transmission time of systems with a larger number of (earlier) channel choices, while at the same time systems with a larger number of tags present would also not be significantly penalized (since earlier passes of the multiple pass algorithm also typically take a much shorter time due to the smaller number of channels available initially). Also, increasing the number of channel choices in later algorithm passes ensures that systems with a large number of tags present will successfully acquire all of the data in a limited number of algorithm passes (thus increasing system reliability). As further described below, the present invention allows a further dynamic adaptation of the number of available channels (as the system is performing a read cycle).

For example, a preferred embodiment of the described system utilizes 128-bits of data 220, with 32 channels in the 1st and 2nd algorithm passes, 64 channels in the 3rd and 4th algorithm passes, 128 channels in the 5th through 8th passes, and 1024 channels in the latter 8 algorithm passes. Note once again that unique subsets of the data 220 are utilized to directly choose 1220 the communications channel 1260 in each pass in this embodiment, resulting once again in a total of 16 algorithm passes before unique, non-overlapping portions of the data are exhausted. Other embodiments of the system may utilize a variable number of channels per transmission algorithm pass that changes after a predetermined number of passes. For instance, the first sixteen passes of the multiple pass transmission algorithm in the above example may utilize anywhere from 32–256 available channels (i.e., five to eight-bits of channel selection data), while the next sixteen passes may utilize anywhere from 256–4096 available channels (i.e., eight to twelve-bits of channel selection data). In this manner, the dynamic channel profile (or number of available channels per algorithm pass) may be extended virtually without limit. Also note once again that the maximum number of passes may be extended by utilizing overlapping or interleaved portions of the data to drive the channel selection algorithm.

The actual choice of the number of available channels per algorithm pass (also called a dynamic channel profile) in a particular embodiment of the system may also depend (in addition to the expected number of tags present in the system) on the expected or predominant type of signal processing algorithms (such as the type of collision mitigation algorithms) utilized in the reader 100. Note that the number of channels may even be decreased in later transmission passes if it is known that collision mitigation techniques (described below) will be utilized in the reader receiver, since such algorithms will effectively free up more channels as time progresses. For cases when the reader receiver algorithms are not known or vary, increasing the number of available channels or maximum transmission algorithm passes helps ensure that the transmission algorithm will converge, and all tags will be identified. In general, any channel profile that changes versus time is considered to be a dynamic channel profile for the purposes of the described system.

In order to make the entire system most efficient, it is desirable to adapt the number of available channels per algorithm pass. This can be readily accomplished while keeping the tag complexity low through the use of simplified signaling mechanisms. Such mechanisms can be utilized by the reader to signal all activated tags to either increase or decrease the number of available channels used for transmission of their data. For example, all active tags may be directed to increase spreading gain in the next transmission pass (or at some other arbitrary time), which effectively requires a 1-bit signaling method to the tags (e.g., a flag signifying active tags to either increase $N_i$, or to leave $N_i$ the same). Alternately, for the example, all active tags may be directed to decrease processing gain in the next transmission pass (or at an arbitrary time), which also effectively requires a 1-bit signaling method to the tags (e.g., a flag signifying active tags to either decrease $N_i$, or to leave $N_i$ the same). Generally speaking, any adjustment of the number of available channels in the system will require the system to also reset to a known state before retransmission.

In the preferred embodiment of the present invention, a signal is sent to all tags indicating whether to either increase, decrease or leave the same the number of available channels (equivalent to 2-bits of signaling information). The information signal to leave the number of channels unchanged may be indicated by the absence of any adjustment signal (in which case the tags will continue to the transmission passes using the same number of channels). Note that such signaling information can be conveyed in very simple forms, such as carrier blanking pulses, in a manner similar to that in application Ser. No. 10/385,893 tiled Mar. 11, 2003, titled "Method and Apparatus for Source Device Synchronization in a Communication System" by Kuffner, et al. For example, a long eater blanking period (i.e., a long pause) could be utilized to signal all active tags to decrease their spreading gain and simultaneously synchronize tag transmissions, and a short carrier blanking period (i.e., a short pause) could be utilized to signal all active tags to increase their spreading gain and simultaneously synchronize tag transmissions.

There are several reasons why it is desirable to adapt the transmission system's spreading gain (or processing gain). The most important reason is that the overall tag reading transaction time can be significantly reduced over systems that employ fixed channel profiles (even those that contain fixed stepping or change points as described above). This is because the system's operation can be optimized by the reader based upon several factors, including but not limited to, an estimated number of tags active in the system (possibly from prior read cycles), the severity of collisions in the system, an estimated signal to noise ratio (SNR) or carrier to interference ratio (CIR) for the communications link, or a desired reliability or read time goal. Such measurements are termed communications link quality factors, and may be determined by factors that are either internal or external to the system. Further description is given below.

For example, if the reader senses that most available channels contain transmission collisions (as further described in Section V below), it may opt to increase the number of available channels in the subsequent transmission pass. It may also opt to increase the number of available channels if the communications link is poor (e.g., the SNR or CIR is below some determined threshold). In the former case, such an action (e.g., increasing $N_i$) will provide more channels for the tags to choose from, thus providing more system resources (e.g., bandwidth or time, or equivalently available code channels or timeslots) and making collisions less likely. In the latter case, increasing $N_i$ will increase the spreading gain of the system, effectively affording higher bit SNRs (for a given chip SNR) after despreading in the reader receiver. Likewise, if the reader senses that few available channels contain transmission collisions or are actually unoccupied (also described below), it may opt to decrease the number of available channels in the subsequent transmission passes. Alternately, the reader may decrease the number of available channels if most tags' data is known in the system to reduce overall reading time (since most tag collisions will be cancelled by the reader anyway).

The reader may also opt to decrease the number of available channels if the communications link is good (e.g., the SNR or CIR is above some other determined threshold). In the former case, such an action (e.g., decreasing $N_i$) will provide fewer channels for the tags to choose from, thus providing less system resources (e.g., available channels or timeslots) and making collisions less likely. In the latter case, increasing $N_i$ will increase the spreading gain of the system, effectively affording a higher bit SNRs after despreading in the reader receiver. Generally, the reader will want to utilize as few available channels as possible in order to minimize total read transaction time, since transmission time increases as the number of available channels increase, as described above.

In the preferred embodiment of the present invention, the tags will begin with a relatively low number of available channels ($N_1$) in order to keep the total read time low For applications with small numbers of tags. Note that this initial number of channels will depend on the expected (or average) number of tags present in the system. In other words, if it is known that there will typically be hundreds of active tags in the system, it may not make sense to start with a small number of available channels, since all channels will likely be in collision. Similarly, if the spreading gain is adapted in only one direction (either up or down), the initial number of channels will be affected, since it will be either a lower or upper (respectively) limit on the number of channels available in the system. Also note that the tags may either act on the adaptation direction before or after the first transmission pass in the system. For example, if the initial number of code channels available is 16, and the tags are directed to increase their processing gain (e.g., based on information from previous read cycles), the tags may choose to transmit on one of 32 available channels in the first transmission pass (i.e., the change applies to the first pass), or the tags may wait until the second transmission pass to adjust their processing gain. Furthermore, the reader may automatically determine to increase or decrease the number of available channels if it has knowledge that the approximate number of tags present in the system is much larger or much smaller (respectively) than the initial number of channels. One form of such knowledge may come from a previous read cycle (in which the actual number of tags was determined), especially if other throughput enhancing methods are utilized in the application Ser. No. 10/385,549, filed Mar. 11, 2003, titled "Method and Apparatus for Electronic Item identification in a Communication System Using Known Source Parameters" by Kuffner, et al. Other forms of such knowledge could come from the reader operator, or other measures that estimate the number of tags present in the system (e.g., total received signal strength, capacitance, inductance measurements).

Note that the adaptation method may be combined with other forms of signaling to the tags in the system, such as with tag synchronization methods described in the application Ser. No. 10/385,893 filed Mar. 11, 2003, titled "Method and Apparatus for Source Device Synchronization in a Communication System" by Kuffner, et al. The preferred embodiment of die invention allows simultaneous tag synchronization and adaptive (i.e., up/down) spreading gain adjustment for the first transmission pass.

Note that the number of available channels in the system may be stepped by any value in general, and through any sequence. For example, the system may have 16, 32, 128, or 1024 channels available, and any adaptation directive from the reader will cause all active tags to step to the next (upper or lower) spreading gain (i.e., number of available channels). Those skilled in the art also appreciate that there are other manners in which to determine the number of available channels utilized by the tags, including, but not limited to having the reader directly signal the number of channels available in the system. In the above channel profile example, 2 bits of signaling information could be utilized to directly specify the spreading gain in the system. Those skilled in the art appreciate that any traditional method of signaling the adaptation information to tags is possible, including a signaling channel utilizing any typical form of modulating information (e.g., BPSK, QPSK, QAM, ASK, FSK, PSK, PCM, PWM, etc.). The preferred embodiment of the invention utilizes a form of PWM in order to keep tag complexity low. The preferred embodiment of the signaling method is further described below.

In the application Ser. No 10/385,893, filed Mar.11, 2003, titled "Method and Apparatus for Source Device Synchronization in a Communication System" by Kuffner, et al., it was disclosed that the tags were all synchronized to the same edge and same sense of the clock with a gap detection circuit and an edge selection circuit. In that disclosure, the gap was used only once at the initial synchronization of the system, after which the RF signal was applied continuously until such time that the reader had determined that the inventory was satisfactorily accounted. There, the standardized spreading channel profile stored on the tag was followed, and the spreading gain automatically updated in each tag based on a local state machine that tracked the pass. In this filing, the tag can still be programmed with a spreading gain profile or alternatively only an initial spreading gain, which it will use to spread its ID after the synchronization gap occurs. Rather than utilizing a reader transmission gap only for synchronization purposes in this example, the gap can occur multiple times within a read cycle, or even within a pass in certain embodiments of the invention, should the reader decide to abandon the present pass and increase or decrease the spreading factor. For example, the block size for estimating received signal statistics (fully described below) may only be a fraction (e.g., ⅛, ¼) of the total packet (i.e., transmission pass) length, and any decisions to adapt the number of available channels could be undertaken after that fraction of the packet data has arrived at the reader. Other embodiments could be conceived by those skilled in the art without departing from the spirit of the invention.

Figure 5:
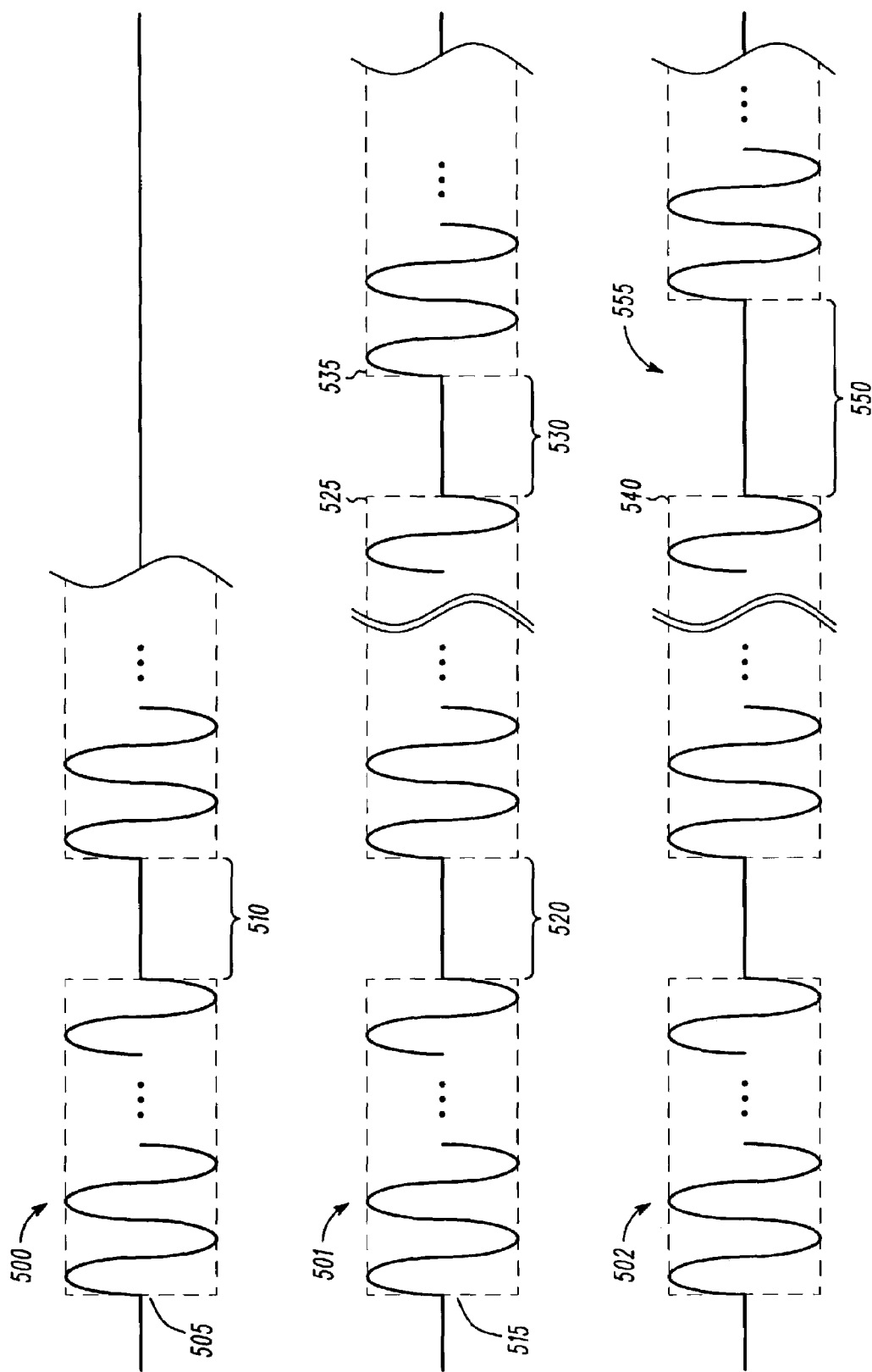
FIG. 5 illustrates the reader waveforms used to adjust the spreading gain of the tag modulator in accordance with the present invention.

Reader transmitter waveforms for the preferred embodiment are shown in FIG. 5. In the first waveform 500, the first gap 510 of duration $T_s$ that occurs after power-up 505 is the initial synchronization gap as used in the application Ser. No. 10/385,893, filed Mar. 11, 2003, titled "Method and Apparatus for Source Device Synchronization in a Communication System" by Kuffner, et al. Only this first occurrence of the gap leaves the tag in its initial spreading gain. If no other gaps occur, the tag will continue to use its internally programmed spreading profile as described in the application Ser. No. 09/981,031, filed Oct. 17, 2001, titled "Channel Selection Method used in a Communication System" by Gurney, et al., as long as the RF signal is applied. However, the reader may now insert gaps at the beginning of a transmission pass (or even within a pass if it so chooses). In the second waveform 501 of FIG. 5, the reader powers up at 515 and inserts a synchronization gap 520 of duration $T_s$. In this example, shown at the end of the first pass 525 (though in general it can occur any time at the discretion of the reader), the reader, based on collision statistics or other signal quality criteria, decides to insert another gap 530, also of duration $T_s$. This and any gap 530 would be detected by the tag synchronization detection circuitry and, based on the fact that it was not the first gap after power-on, interpreted as a command to adapt the processing gain. The tag does not power down during the gaps but draws upon charge reserved in a storage capacitor to operate through the gap, as described in the application Ser. No. 10/385,893, filed Mar. 11, 2003, titled "Method and Apparatus for Source Device Synchronization in a Communication System" by Kuffner, et al. One embodiment of the tag would interpret this gap as a command to reduce the spreading gain by a factor of two (e.g., from an initial value of 32 to a new value of 16). For the second pass starting at time 535 then, the tag would use the newly decremented spreading gain.

The third waveform 502 in FIG. 5 shows a waveform similar to that in 501 but this time, at the end of the first pass 540, the reader inserts a gap of different (e.g., longer) duration 550, in this case 2 Ts, though other values are possible. The tag will be able to differentiate between the nominal synchronization pulse duration 510, 520 and the extended duration 550, and interpret this occurrence as a command to increase the spreading gain by a factor of 2 (e.g., from 32 to 64). When the second pass commences at time 555, the tag will be using its new, higher spreading gain.

Figure 6:
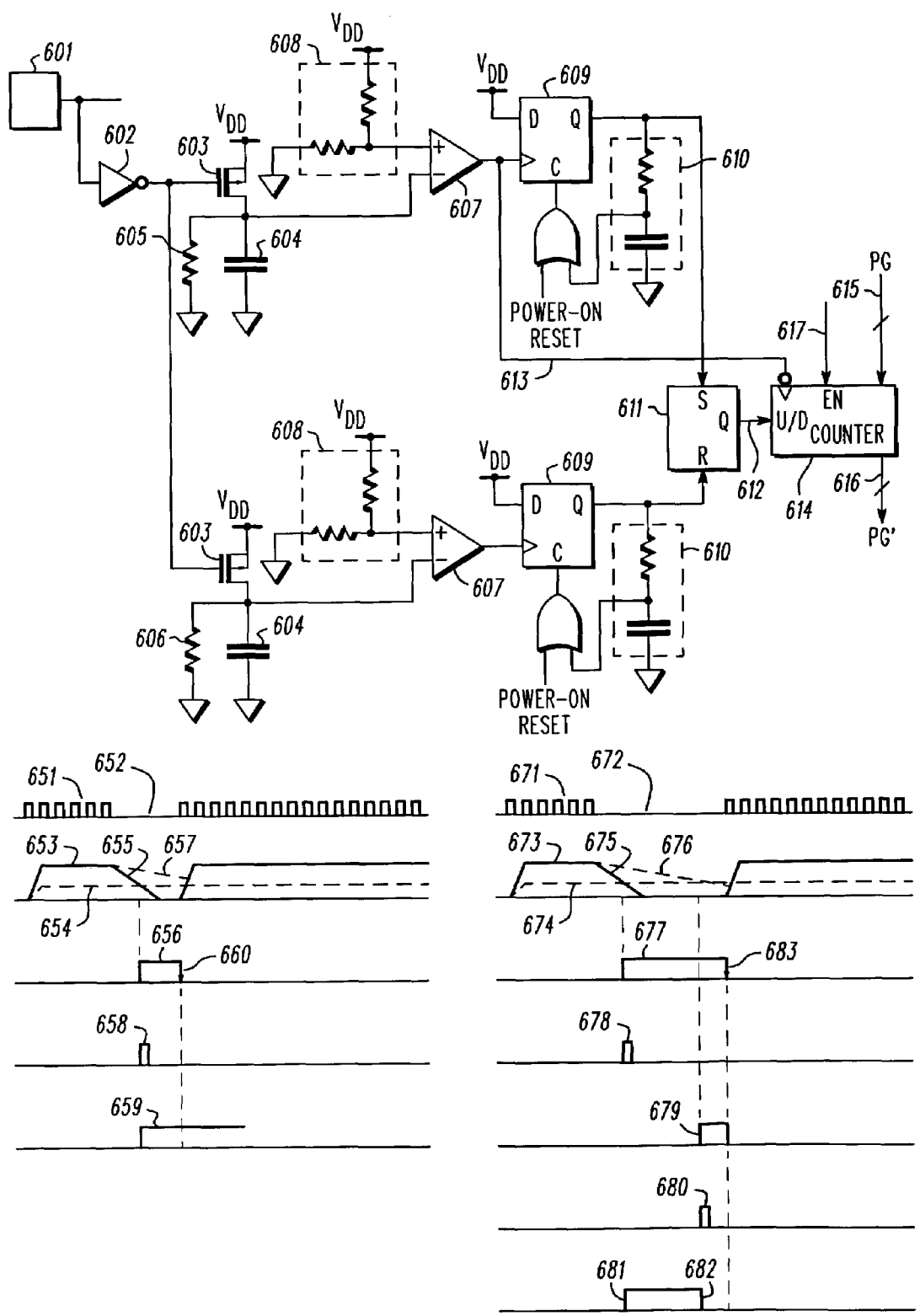
FIG. 6 illustrates a preferred embodiment of the tag circuitry used to detect the reader command waveforms as well as the waveforms of the tag detection circuitry in accordance with the present invention.

An example of the tag circuitry used to detect the reader transmission gaps is shown in FIG. 6. An inverter 602 is connected to one of the tag electrodes 601 to extract a clock signal. The inverter output drives two ramp generators that are composed of a charging element 603 and a charging capacitor 604. When the inverter 602 output goes low, the charging element very quickly sources a charge onto capacitor 604. When the inverter output goes high, the capacitors 604 begin discharging through the discharge elements 605, 606. The values of these discharge elements are set to provide two different discharge rates, one long (606) and one short (605). They discharge slowly compared to the cycle time of the RF waveform so that capacitors remain essentially charged with some small amount of ripple while the RF is on. When the gap occurs, it lasts long enough that at least the fast time constant capacitors discharge. The voltages on each capacitor 604 are compared to a threshold 608 by comparators 607. The comparator outputs trigger one-shot generators that consist of D-flip flops 609 with an RC feedback 610 to clear the flop output. (The ramp generator and one-shot circuits used here are similar to those disclosed in the application Ser. No. 10/385,893, filed Mar. 11, 2003, titled "Method and Apparatus for Source Device Synchronization in a Communication System" by Kuffner, et al. The short pulse generated by the one-shots either sets or resets an SR flip-flop 611. The output 612 of this flip-flop is then used as an up/down count control for counter 614. The counter is used to increment, decrement or hold the value of the initial spreading gain 615 to arrive at the modified spreading gain 616. The state of the SR flip flop 611 when the comparator output 613 returns low again (the RF turns on again) is the state that is used to determine whether the counter increments or decrements. If there is no gap present, there is no falling edge on 613 and the counter is not triggered to change state.

FIG. 6 shows a counter enable 617 on the up/down counter. This optional input can be used by the tag state machine to keep the spreading gain from changing on the very first synchronization gap. The tag needs to be synchronized prior to communication, so a beginning synch gap is needed. However, if it is desired to keep the spreading gain from changing state at this initial synch, then the counter must be disabled. Alternatively, the initial state of the counter can be set one higher than the desired initial processing gain, so that when an initialization gap that commands the tag to reduce its spreading gain comes along, the spreading gain will decrease from an intentionally high value (e.g., 64) to the desired starting value (e.g., 32). After the first synch pulse, this control could be released so that the spreading gain may be altered by the reader.

An example of the tag waveforms for this circuit are also shown in FIG. 6. The input of inverter 602 is shown in waveform 651 with gap 652. The voltage on ramp capacitors 604 is shown in waveform 653, and the comparator threshold 608 is shown as dashed line 654. When the faster time-constant capacitor discharges with ramp 655, it crosses the threshold and the comparator outputs pulse 656. Slower discharging ramp 657 does not fall below the threshold before the gap 652 terminates. The rising edge of 656 causes the one-shot waveform 658 to appear at the output of flip-flop 609. This in turn sets flip-flop 611 to the high state 659. When the gap 652 terminates and 656 has a falling edge 660, the falling edge triggered up/down counter 614 counts down by one count, decrementing the initial value of the spreading gain 615 by one count.

Tag waveform 671 shows the clock with long gap 672. Waveform 673 shows the capacitor charging voltages with fast discharge ramp 675 and slow discharge ramp 676, along with threshold 674. 675 crosses the threshold first and in turn sets 612 to a high state 681. This time the gap 672 is longer and the ramp 676 also falls below the threshold, clearing 612 to a low state 682. When the falling edge 683 of detected gap pulse 677 occurs (or alternatively the falling edge of gap pulse 679), it clocks the up/down counter with the low state control at 612, incrementing the counter and the processing gain by one count. If no gap occurs, the up/down counter 614 is never triggered because waveform 613 never has a falling edge, and the processing gain is left unaltered. Control line 612 remains in its previous state until another gap comes along, at which time it will be set by the short time-constant ramp and the process begins again.

Specifically, in the preferred embodiment of the described system, the random channel choices are utilized to select a particular spreading code (or code channel in 1220) in each pass of the multiple pass transmission algorithm. More specifically, in the preferred embodiment, portions of the data 220 stored/programmed on the tag 110 are used to directly specify a time offset (or code phase as in 1220) of a length-N specially augmented m-sequence (where N is equal to the number of channels in a particular algorithm pass, as described above). Note that spreading codes may also be complex valued, without any loss of generality. This process is shown schematically in FIG. 11. Different phases of a PN sequence are commonly obtained by applying a masking function (or AND-XOR reduction network 1100) of the PN generator (LFSR) state, which effectively performs a modulo-2 sum of two or more m-sequences to produce a third code phase of the same m-sequence. Thus, all of the tags 110, 120, 130 use the same basic LFSR (m-sequence) generator in each algorithm pass, beginning with the same initial generator state in the preferred embodiment, such that all of the tags 110, 120, 130 transmissions are synchronized to a known basic initial generator state. These aspects are key to quick and effective demodulation in the reader 100, as described in Section IV below. Note that the basic LFSR sequence generator length (i.e., primitive polynomial) typically changes dynamically (changing the number of channels) per algorithm pass, as described above.

The traditional m-sequence generators are typically made to be specially augmented PN sequence generators by forcing a zero output for the first chip (or PN bit) time in the preferred embodiment, ensuring that the cross-correlations of the sequences from different tags will be zero over a given sequence period. Note that other types of orthogonal function generators could be used in the place of the LFSR PN generators (e.g., Walsh or Hadamard functions) in other embodiments, though such codes would not have as desirable interference rejection capabilities. The data 220 stored on the tag 110 is then spread by the generated spreading codes 1260 by traditional means 1230 (e.g., an XOR gate in digital implementations, or a multiplier in analog implementations, as is well known to those skilled in the art). The spread data signals of the activated tags are then sent (in aggregate) over the given communications channel.

Note that the tags could employ a range of modulation types to transmit their data (e.g., amplitude modulation, phase modulation, frequency modulation, or some combination thereof). The preferred embodiment of the system utilizes a form of amplitude shift keying, ("ASK") from load modulation via transmission element 702, though other modulation types and implementations are certainly possible (e.g., Differential Quadrature Phase Shift Keying, Quadrature Amplitude Modulation, Pulse Code Modulation, Pulse Amplitude Modulation, Pulse Position Modulation, etc.). The use of many different carrier frequencies for transmitting tag information are possible, ranging from tens of kilohertz to several gigahertz (e.g., 125 KHz, 13 MHz, 900 MHz, 2.4 GHz). The employment of a variety of data encoding and mapping techniques is also possible with the described system. Some examples of encoding techniques include, but are not limited to, return to zero (RZ), non-return to zero (NRZ), Manchester, and differential encoding, which are all well known in the art. Note that it is possible to use many different encoding, modulation, coding and signaling types in the invention without loss of generality, as is known to those skilled in the art. Some examples of coding techniques include CRC codes, convolutional codes, block codes, etc., which are also all well known in the art.

The tags 110, 120, 130 in the preferred embodiment also directly modulate the carrier supplied by the reader 100 via transmission element 702; thus, they have no local oscillator (though the use of a locally generated carrier is certainly possible within the scope of the described system, and does not in any way limit its application). In the preferred embodiment of the described system, power converter 703 rectifies the carrier signal from the reader 100 so that the reader 100 remotely powers the circuitry on the tag 110. Note that the use of actively powered tags is also possible and does not in any way limit the use of the present invention. A general goal of the system is to minimize the complexity of the tag 110, and through the use of the described techniques in the preferred embodiment, the circuitry on the tag 110 can be kept to a minimum.

IV. Fast Demodulation Methods

Figure 13:
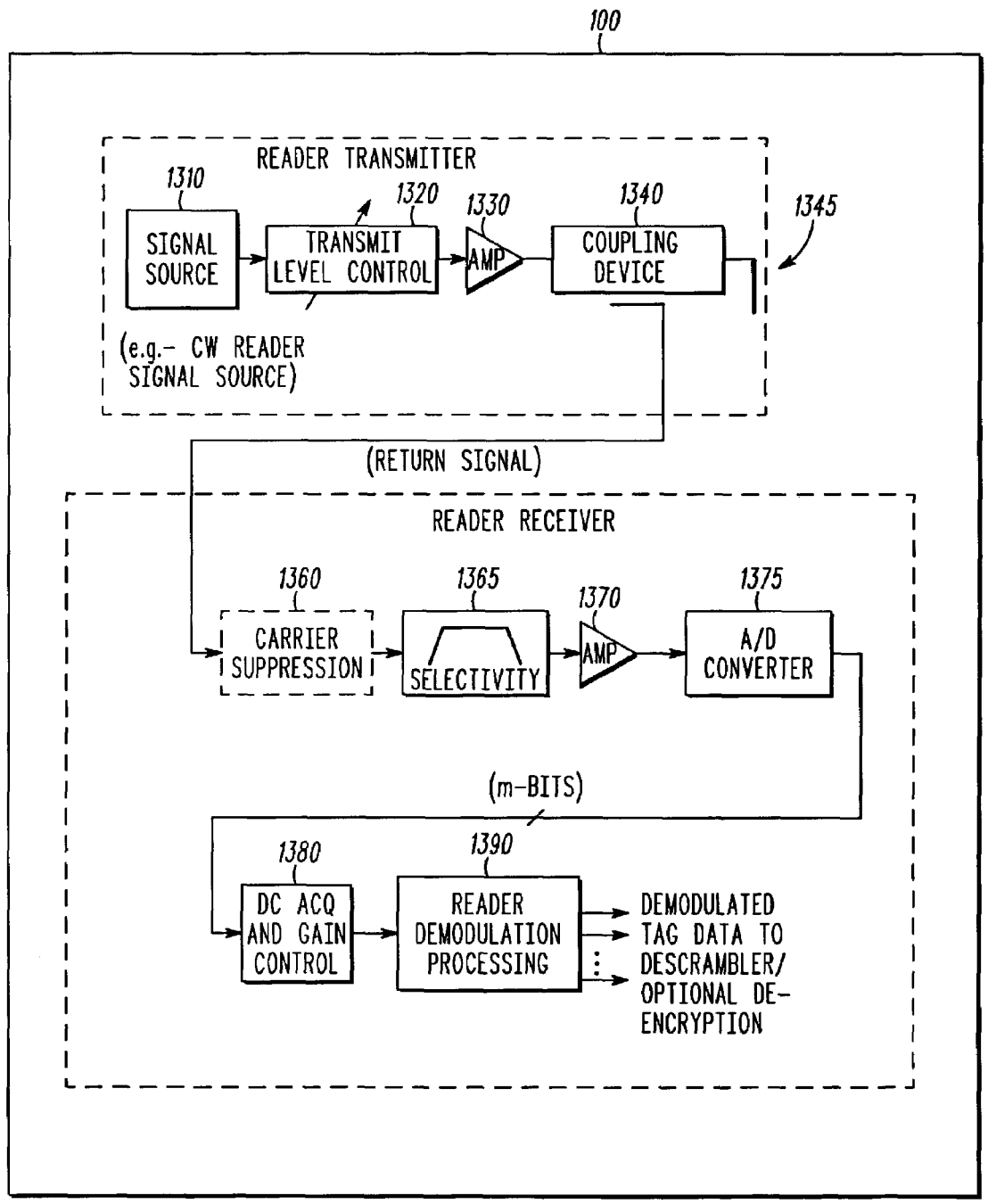
FIG. 13 illustrates a detailed view of the reader block diagram in accordance with the present invention.

The reader is responsible for performing many important signal processing steps. As shown in FIG. 13, the reader 100 typically begins the reading process of the tags 110, 120, 130 by initializing the output of a signal source 1310 with a transmit level control 1320 and amplifier 1330, and transmitting power at some minimum level. The reader 100 then begins transmitting a continuous wave at that level in the preferred embodiment. Once the reader 100 is transmitting at a particular power level, it typically listens (via the coupling device 1340 and antenna 1345) for any return signal from the tags 110, 120, 130. This activity detection may take the form of a modulation or energy detection measurement, such as detecting signal levels or signal swings in each of the possible communications channels (which is further described below). It is desirable to make this measurement and characterization period as short as possible, so if no tags are activated at a particular power level, the reader 100 can rapidly step (generally in an increasing manner) to the next power level. If signals are sensed at a particular transmit power level, the reader 100 may begin the full demodulation processing 1390 (possibly employing collision mitigation techniques, as discussed in Section V below). Note that the reader 100 may also send out modulated carrier signals, synchronization pulses, or asymmetric carrier waveforms in other embodiments of the system without loss of generality. The signal processing performed by the reader 100 can be performed in either hardware or software architectures, or some combination thereof. Typical embodiments will include some selectivity 1365, amplification 1370, analog-to-digital conversion 1375, and DC acquisition and gain control functions 1380.

In general, the reader 100 may also perform active or passive suppression 1360 of its carrier signal in certain embodiments, and interference or noise cancellation (for any form of interference from sources other than the desired tags in the system).

As stated above, the preferred embodiment of the present invention utilizes spread spectrum modulation in the tags 110, 120, 130. Thus, the received data must be despread in the reader 100 for each code channel by first reverse-applying each possible spreading code (or the complex conjugate of each complex spreading code), as is well known in the art.

More specifically, because the preferred embodiment of the described system utilizes specially augmented m-sequences as spreading sequences in the tag 110, very fast and efficient demodulation (i.e., despreading and channelization)

techniques can be utilized in the reader demodulation processing 1390. These techniques substantially reduce (e.g., by about a factor of 57 in the preferred embodiment) the processing power required in the reader demodulation processing 1390, which results in faster reading times and lower cost implementations of the reader 100. The actual processing savings will depend on the number of channels employed in each pass of the multiple pass system, and can be expressed in terms of a factor (F) which is equal to the ratio of the number of traditional despreading operations to the number of improved despreading operations per symbol (using a combination of received sequence re-ordering and Fast Hadamard Transforms (FHTs)):

$$F = \frac{1}{L}\sum_{i=1}^{L} \frac{(N_i)^2}{N_i * \log N_i} = \frac{1}{L}\sum_{l_{passes}} \frac{N_i}{\log N_i},$$

where L is equal to the number of passes required to successfully demodulate the source data, and $N_i$ is (once again) equal to the number of channels in the $i^{th}$ pass. This factor directly represents a processing savings (which is typically expressed in terms of millions of operations per second (MOPS) or millions of instruction per second (MIPS)) in the reader demodulation processing 1390. Thus, in this example, a processor 1390 that is fifty-seven times less capable (e.g., 10 MOPS vs. 570 MOPS) may be utilized in the reader 100 in the preferred embodiment in the best case (with no collision mitigation as described below).

Recall that specially augmented m-sequences (shown in box 1120 of FIG. 11) are an orthogonal extension of traditional PN sequences, which have some similarities to orthogonal Walsh codes (shown in box 1420 of FIG. 14); namely, the two sets of sequences have the same number of binary ones and zeroes in the sequence (i.e., they are of equal weight). In fact, the two types of sequences (i.e., length $N_i$ specially augmented m-sequences and Walsh sequences) are related through the use of a single special re-ordering function. This special re-ordering function is derived directly from the primitive polynomial that is used to generate the base m-sequence (as is shown in the tag sequence generator 1110) in reader receiver block 1520 of FIG. 15. The sequence re-ordering function 1510 is used to directly re-order the data samples (or elements) as the receiving device 1375 receives them, as fully described below. The receiving device 1375 could be an analog to digital converter, an analog sample and hold device, a register, or any other device that receives a signal. Note that a single sequence re-ordering 1510 function is applied to the composite received signal, which consists of transmissions from several different tags 110, 120, 130 using multiple code channels (or code phases as in 110).

Once the composite received signal (comprising several m-sequence code phases) has been re-ordered in a storage medium, such as a memory buffer 1530, it resembles sequences from a set of valid Walsh sequences, and fast transform techniques, such as a Fast Hadamard Transform (FHT), may be utilized to rapidly (and concurrently) despread the data from the tag 110 for all data channels (as shown in 1540). FHTs are used to rapidly correlate data sequences against a complete set of Walsh codes (in parallel), as is well known in the art. Any transform related to FHTs (e.g., Fast Walsh Transforms, Walsh-Hadamard Transforms, recursive Walsh transforms, etc.) may be utilized with the described fast correlation methods without departing from the spirit of the described system. Also note that all of the described processing techniques can be performed in either the analog or digital signal processing domain.

Figure 14:
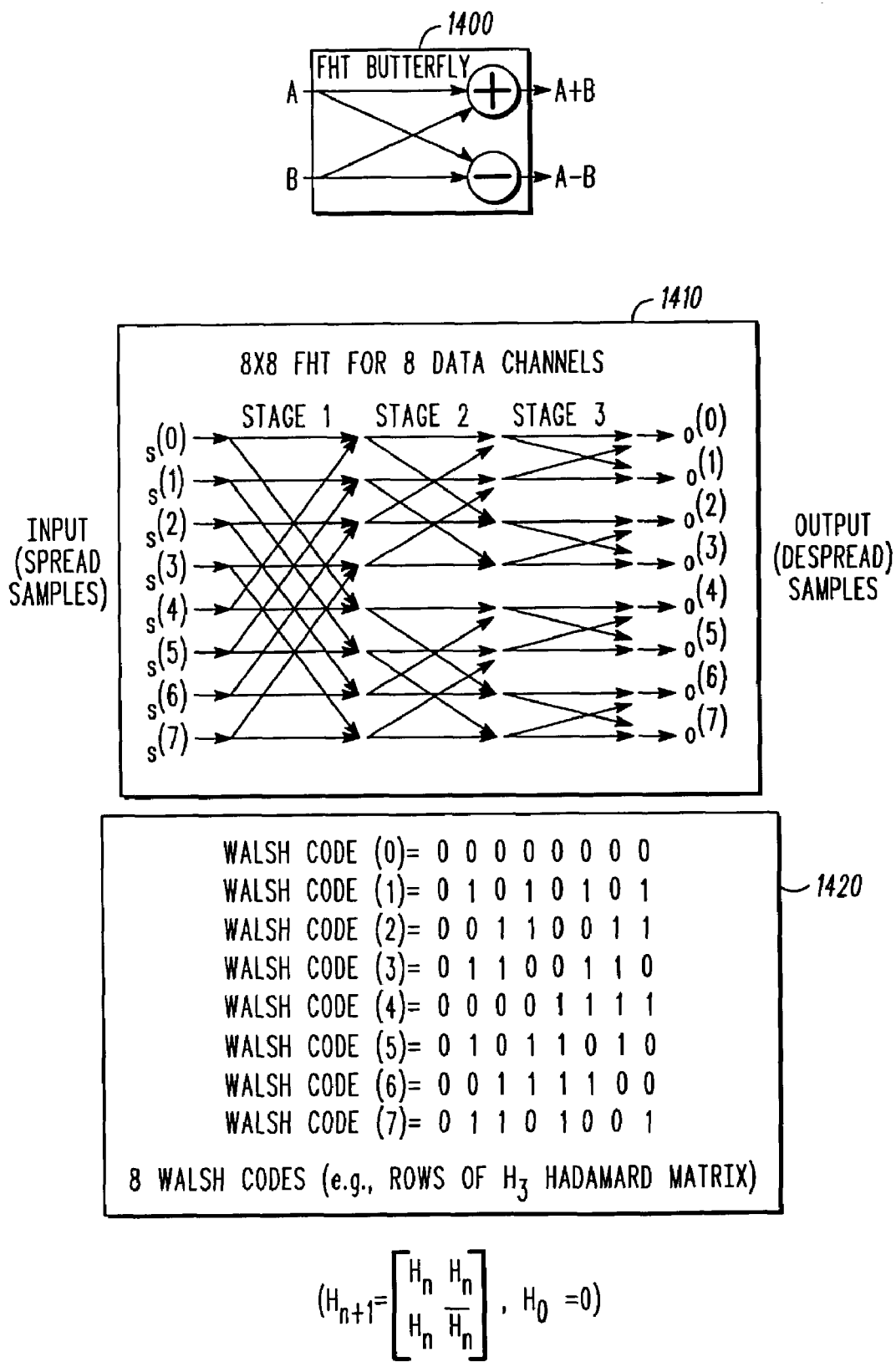
FIG. 14 illustrates an example of fast transform methods for Walsh coded signals in accordance with the invention.

Note that traditional FHT algorithms (e.g., as shown in box 1410) are well known, and their basic kernel operation (box 1400, termed a 'butterfly') is shown in FIG. 14. A radix-2 FHT butterfly is similar to a radix-2 FFT butterfly, though it consists of multiplying the data elements by only a +1 and −1 value (or equivalently adding and subtracting the data values together). The trellis structure 1410 of an 8×8 FHT is also shown. Each output of an FHT 1550 is termed an FHT bin or FHT code channel. A N-point FHT effectively correlates against all possible length N orthogonal Walsh sequences when completed. In the preferred system, this is equivalent to correlating against all possible code phases for a length N sequence. Since the FHT is a fast transform, it can be shown that the processing savings over traditional correlation (similar to the factor F expressed above) is equal to ($N^2$/N log N) for an N-point orthogonal sequence. This same savings is realized by utilizing the described fast correlation techniques.

The exact received data special re-ordering function 1520 is determined by observing the states that the tag Fibonacci LFSR (as shown in 1110, or its equivalent) cycles through during normal operation (also refer to the example below). The states that the LFSR progresses through correspond directly to the special re-ordering function, or the indirect addresses that the incoming (spread) received data samples must be stored at in the received data memory buffer (1530 or other storage medium) as they are received (linearly) in time. This sequence of addresses (in 1520) may alternately be stored in a storage medium (e.g., Random Access Memory, Read Only Memory, Hard Disk Drive, etc.) instead of being actively generated in the receiver. Note that these sequences need only be generated once for each base spreading code (i.e., primitive polynomial) utilized in the system. In this manner, the elements of the received m-sequences (or sums of m-sequences) are re-ordered such that they now represent exactly the elements in Walsh sequences (or more specifically, the rows in a Hadamard matrix). Thus, a traditional fast (Hadamard) transform (correlation) method may now be utilized (in 1540) to effectively despread the received data channels in parallel. Note that the data sequences can also be double buffered in memory to accommodate any processing latency.

Figure 17:
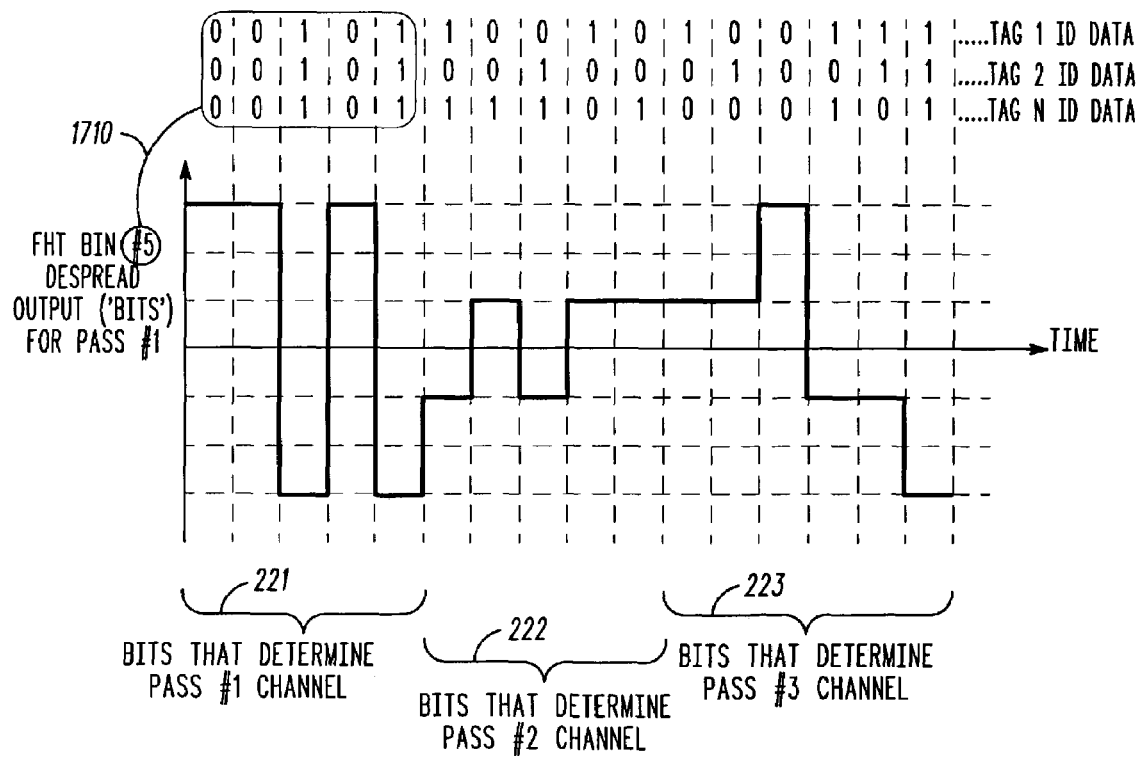
FIG. 17 illustrates an example waveform in the presence of a collision in accordance with the present invention.

The output indexes (or bins) 1550 of the FHT that exhibit signal energy correspond directly to the mask values 1130 (when expressed in binary) that were used in the AND-XOR reduction 1100 in the tags 110, 120, 130. For example, the channel selection code 1130 (the 'c0–c4' shown in FIG. 11) (transmitter processing) directly corresponds to the active outputs 1550 of the FHT block 1540 in FIG. 15 (receiver processing). Recall that the binary mask value 1130 is applied in the tag 110 to select a particular code channel (or code phase). This is also shown in FIG. 7, where the mask 710 is drawn from the tag data 240 to input to the channel selection 240. That is, the binary mask value 1130 (and FHT bin index) directly corresponds to the data 221, 222, 223, 224 stored on the tag 110, that was utilized to select a channel during a particular pass (see also identifiers 1710, 1820, 1830 and 1840 in FIG. 17 and FIG. 18 for a supplementary demonstration of how tag data relates to the channel choice). Each tag 110 will send its data 220 over a fixed channel 1260 for the duration of each of the passes of the multiple pass algorithm in the preferred embodiment. The output signal level at each FHT bin corresponds directly to the signal level on each code channel 1260 (e.g., for each code phase) after despreading. Thus, the composite received signal has effectively been channelized into its constituent components at the output of the FHT.

Figure 18:
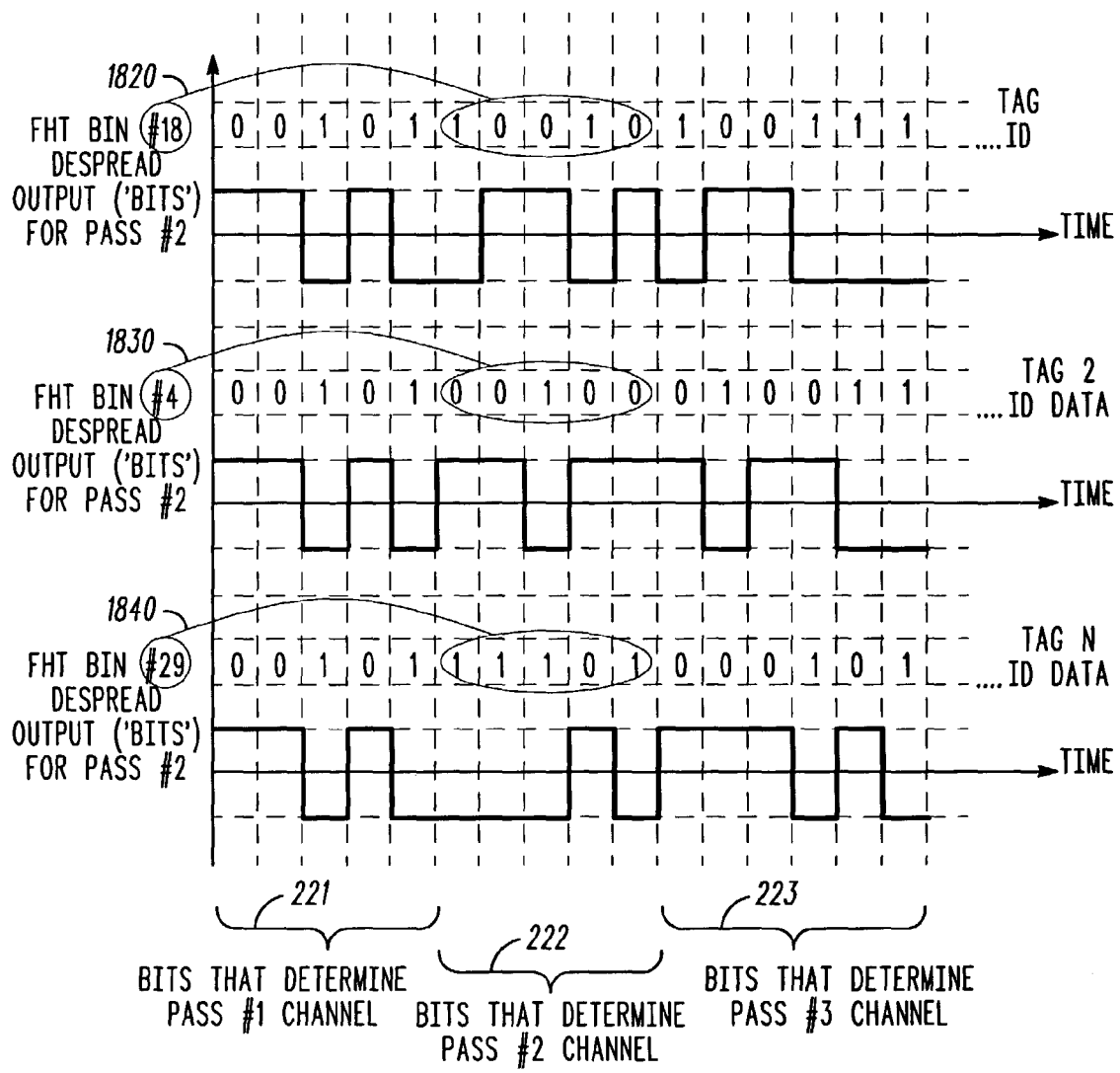
FIG. 18 illustrates several example waveforms in the absence of collisions in accordance with the present invention.

As further discussed below, the data signal 1550 at the output of each active FHT bin during the channel selection portion of the received data sequence can be verified by matching it up with the binary FHT index value (since the two sequences should match for valid data). This technique enables a crude form of additional error detection, and is shown in FIG. 18 for Pass #2 of the multiple pass transmission algorithm. Note that the data sequence 1820, 1830, 1840 over the portion 222 used to select the channel 240 for the second pass is the binary equivalent of the FHT bin number.

Figure 15:
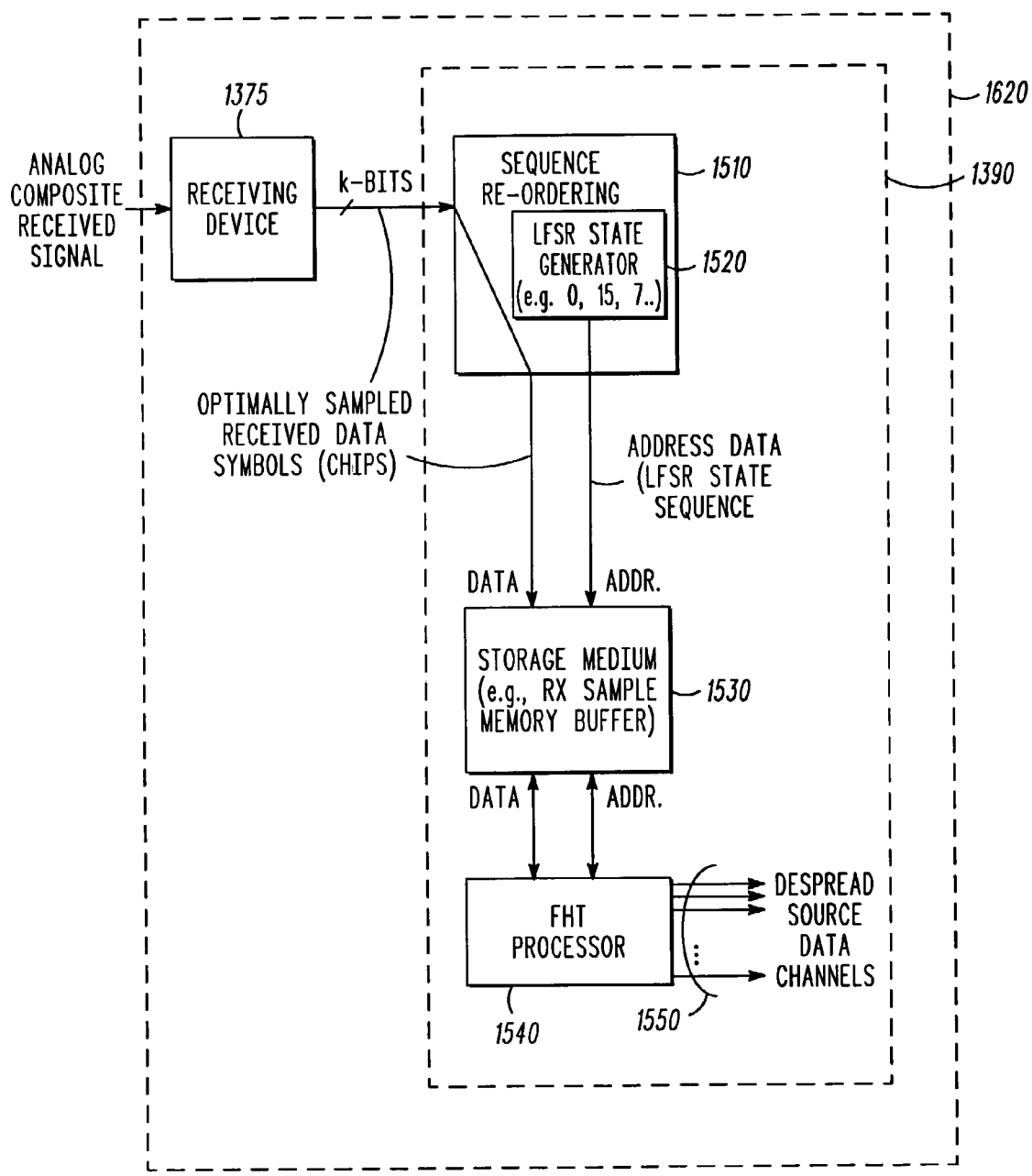
FIG. 15 illustrates a detailed example of the reader receiver signal processing for fast correlation of pseudonoise sequences in accordance with the invention.

Through the combined re-ordering and FHT technique shown in FIG. 15, the demodulator is able to rapidly demodulate (i.e., despread) all possible code channels (i.e., code phases) in the preferred embodiment. Note that a N-point FHT will typically be required to demodulate N-channels for each received symbol period in the receiver (which corresponds to the required dechannelizing and despreading operation for each potential data channel and symbol). Also note that other embodiments of the transponder system may utilize orthogonal Walsh codes for channelizing functions, in which case the FHT bins would correspond directly to the Walsh code channel indexes (and no re-ordering process is necessary). Such a system would not have as good of interference rejection capabilities when compared to the preferred embodiment though, since Walsh channelizing codes are periodic and could be highly correlated with periodic interference sources. Therefore, the preferred embodiment of the system utilizes specially augmented m-sequences as channelizing functions, and the above described demodulation techniques. Also note that it is not strictly necessary to utilize the described fast correlation techniques in the described system (i.e., brute force or traditional correlation/despreading techniques may be utilized), though the implementation cost (e.g., circuit area and current drain) will be higher in such implementations.

As an example, for a system that utilizes length 16 (N=16, n=4) specially augmented PN sequences in the tag transmitters, the sequence 1260 represented by the channel selection value 1130 ($n_i$) of '0001' (1) in binary will be '0111101011001000', while the sequence 1260 represented by the channel selection (mask) 1130 value of '1001' (9) in binary will be '0010110010001111' (which is just a different time shift or code phase of the same basic m-sequence that is subsequently specially augmented with a leading zero). An example of the tag PN generation and mask circuitry for a primitive polynomial of 23 (when expressed in standard octal notation) is shown in FIG. 11. Two tag transmitters are assumed to send these sequences independently over the communications channel. The reader receiver will resolve these two signals using a special re-ordering function 1520 and FHT processing (as shown in FIG. 15). The special received data sample re-ordering that must be utilized for the transmitted PN sequences is the same as the states that an equivalent specially augmented PN generator would cycle through, or {0, 15, 7, 11, 5, 10, 13, 6, 3, 9, 4, 2, 1, 8, 12, 14, the same as is shown in 1120} for this example. This sequence may be generated in the reader 100 by replicating the m-sequence generator 1110 that is utilized in the tag 110, and observing the PN generator states, or by simply storing the required re-ordering sequence in memory. The re-ordering sequence is utilized to store the incoming received data sample stream into memory using indirect addressing. For example, the first valid A/D sample (optimally sampled at the spreading or chip rate) that arrives at the reader is stored in memory buffer location 0 of storage medium 1530 (as is the case for all specially augmented codes), the second sample is stored at memory location 15, the third at location 7, and so on. Once N (16 in this example) samples are received, normal FHT processing 1540 can be performed on the newly re-ordered data samples in the memory buffer 1530. The re-ordering function will translate the '0001' PN code above into the sequence '0101010101010101' (which is identical to Walsh code 1) and the '1001' PN code into the sequence '0101010110101010' (which is identical to Walsh code 9). The FHT 1540 will indicate that signal energy is present (e.g., tags are transmitting) in bin 1 (corresponding to channel code 1) and bin 9 (corresponding to channel code 9) of output 1550. Thus, by observing the bin 1 and bin 9 FHT outputs for each transmitted symbol, the remainder of the tag data can be sensed.

Note that the techniques described above may be utilized for traditional (i.e., non-specially augmented) m-sequences by assuming in the receiver that the first chip (or symbol) that is sent by the tag 110 is a binary zero (which is equivalent to a +1 normalized signal value on the channel), even though no such signal was actually sent. Thus, the first buffer location in the storage medium 1530 is initialized to a +1 value, and processing (i.e., re-ordering 1510 and FHTs 1540) continues as normal. In this manner, very fast correlation can be performed for multiple code channels (or code phases) for traditional PN sequences. Other normally augmented PN sequences can also be accommodated by keeping track of where the additional chip (e.g., other than the first chip as described above) is inserted into the sequence.

The above described fast correlation techniques (i.e., a particular receive sequence re-ordering 1510 and FHT 1540) apply to any communication system that uses PN sequences that can be generated with an AND-XOR reduction network 1100 (whether or not they are generated with such a network). Many popular communications systems utilize these types of PN sequences, or sequences generated from a combination of traditional m-sequences (such as Gold codes, as is well known in the art). Some examples of such systems are the IS-95, IS-2000, 3GPP CDMA cellular systems, and the GPS CDMA location system. The above fast correlation techniques can be equally as effective in these systems.

Figure 16:
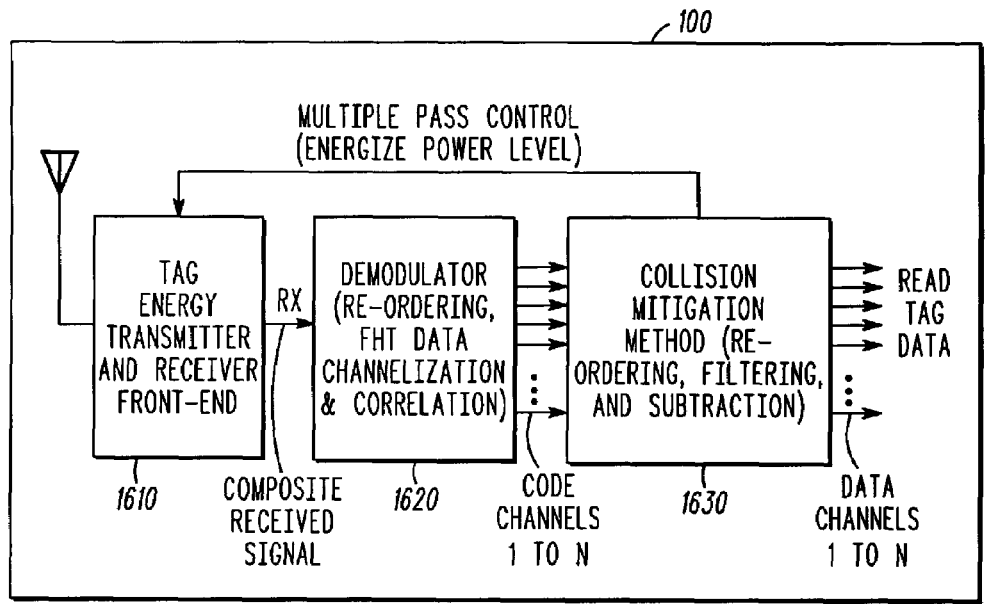
FIG. 16 illustrates a simplified functional block diagram of the reader signal processing in accordance with the present invention.

In any case (regardless of the channelization techniques employed), the composite received signal must be filtered and amplified in the receiver front end 1610, and then channelized (or de-channelized) 1620 in the reader 100 as illustrated on FIG. 16. Each channel is then generally processed separately (though possibly concurrently) for signal and collision detection purposes (generally in 1630). For example, in another embodiment of the system that uses Walsh codes in place of the described m-sequences, an FHT operation could still be utilized to simultaneously demodulate all of the different data channels as described above. Other embodiments of the system may utilize a bank of (parallel or time-shared) traditional despreaders (in place of 1540, 1620) to perform the dechannelization and despreading process. A despreader typically consists of a multiplier followed by an integrate and dump function, as is well known in the art.

In another example of the communication system, other embodiments may utilize orthogonal timeslots as the channel (such as in a slotted ALOHA system), in which case signals from different tags would be demodulated as they arrive (at different points in time). It should be noted that the selected channelization method does not change the general type of collision mitigation algorithms that can be employed in the reader 100, as further described below.

Also note that the demodulation process is generally a multiple iteration process in many embodiments of the present invention, since it is typically not likely that all tags will successfully transmit their information on the first pass of the multiple pass transmission algorithm. Thus, the reader 100 must remain powered up (at the same power level) and continually demodulate the incoming data until all data from the tags has been successfully received (further using the methods described below). Also, when advanced collision mitigation techniques 1630 are utilized in the reader 100 (as detailed below), multiple demodulation iterations (e.g., FHTs) may be required for each pass of the multiple pass algorithm. Also note that subsequent passes of the multiple pass transmission algorithm may require the demodulator to adapt to a new number of channels, as described in the dynamic channel profile discussion above.

V. Collision Mitigation Methods

As mentioned above, there are a limited number of communications channel resources in this (and any) communications system for which the tags 110, 120, 130 can utilize to communicate to the reader 100. Since there are a limited number of communications channels, and no organized assignment of channels among multiple tags (i.e., random assignments are effectively utilized), there will inevitably be collisions of transmissions from the tags in the described system. A collision is defined as the case or event when two or more tags choose to communicate on the same channel at the same time (i.e., during a particular pass of the multiple pass transmission algorithm). It should be recalled that the assignments are effectively random because the data stored on the tags closely approximates uniform random data, as indicated in Section I of this document.

It is possible to either utilize or not utilize collision mitigation techniques in the reader 100 in the described system (as further detailed below), depending on the desired complexity of the reader 100. For instance, a low cost receiver may not utilize any collision mitigation techniques, while a higher cost (higher processing power version) of the receiver may utilize advanced collision mitigation techniques.

The general discussion below first assumes that no particular collision mitigation techniques are utilized, and then later examines cases where collision mitigation techniques are utilized. Note that the tags 110, 120, 130 in general transmit the same patterns regardless of whether collision mitigation is utilized in the reader 100. Each tag (e.g., 110) is in effect 'blind' to other tags present in the system (e.g., 120, 130). Performing the following additional steps further carries out the demodulation process in the receiver.

In general, the reader 100 cycles through each of the possible despread communications channels (either sequentially or concurrently) in a given communications pass, and looks for signal activity or signal energy on each. The reader receiver in the described invention should also be able to detect collisions on each of the available channels, as fully described below. All of these signal characterizations occur per channel, and are generally performed once despreading is completed in order to reduce implementation complexity (though it is also possible to perform equivalent operations before despreading without loss of generality). Note that the received signal is synchronously sampled (at the optimal sampling point) in the preferred embodiment of the system, though other methods (involving oversampling and the post-sampling determination of optimal sampling time are possible).

The preferred embodiment of the receiver utilizes a reduced complexity method of estimating the signal energy on each channel. In particular, this method examines the cumulative (summed) absolute value of each channel's optimally sampled despreader output signal in the described invention. If the accumulated absolute value for a given channel exceeds a predetermined threshold, a signal is said to be present on that particular channel. The following equation shows one method utilized to calculate the accumulated absolute value ($ABS_k$) for channel k, where $DS_{k,n}$ is the unnormalized optimally sampled despreader (FHT) output for channel k and symbol n, $N_i$ is the number of available channels (or spreading sequence length), B is the estimation block length (in bits or symbols), and n is the bit or symbol-time index:

$$ABS_k = \frac{1}{N_i B} \sum_{i=1}^{B} |DS_{k,n}|$$

Generally, this calculation is performed for all k (or $N_i$) available channels to determine if a signal is present on each channel. The predetermined threshold may be made programmable or adaptive (based on other conditions in the reader receiver). This method has the advantage over traditional energy estimation (sum of squares) means in that it does not require costly multiplication operations to determine the presence of signals. Note that the above average absolute value measure (ABSk) is also a measure of the average signal amplitude for a source device when the channel is determined to be single occupied (i.e., have only a single source device utilizing it). This information, along with the corresponding variance information for a given channel, can be utilized to determine the system's operating point (e.g., SNR, CIR, etc.). Typically, the system will operate within specified limits, and adjustments to system processing gain can be made by the reader to keep the system operating within those limits.

Specifically, in one particular embodiment of the system, the presence of a low deviation ASK signal(s) from a tag is typically detected by subtracting out any mean signal level (i.e., dc value as in 1380) from a channel to obtain a normalized signal, and examining the absolute value of the remaining (normalized) signal, as described above. Note that a form of automatic gain control (also in 1380) may also be applied to further normalize the signal levels.

Once a signal is detected on a particular channel, the reader 100 must typically detect if a collision has occurred on that channel. This may typically be achieved by examining the variance of the absolute value of the normalized signal level over some time period. If the variance of the absolute value of the signal exceeds some (different) threshold, a collision is said to have occurred on that particular channel (due to conflicting binary data values of different tag's ID data—see FIG. 17); otherwise, a single signal is said to be present on that channel (as in FIG. 18). A channel with a single signal present on it is also termed a "single occupied" channel. Once again, those skilled in the art recognize that filtering or averaging of these measurements and indicators may be utilized to increase their reliability (e.g., to increase the SNR of the estimates). Thus, the longer the time period that is observed for such measurements (and utilized in the subsequent filtering), the more accurate and more reliable the estimates will become (i.e., the higher the processing gain).

As mentioned, the reader receiver can sense collisions on each channel by examining the variance of the normalized signal on each channel. The variance of the normalized signal can be thought of as an error signal, and represents deviation from an ideal signal. Once again in the preferred embodiment, a reduced complexity means for determining signal collisions is performed. In particular, the absolute value of a normalized (possibly dc-corrected) error signal is accumulated for each channel. Using the same values as in the equation above, the normalized variance for each channel ($VAR_k$) can be computed as follows for each despreader output, where B is once again the (possibly different) estimation block length:

$$VAR_k = \frac{1}{B}\sum_{i=1}^{B} ||DS_{k,n}|-ABS_k|$$

This computation is once again generally performed for each code channel to determine if two or more signals are present on a given channel. If the cumulative absolute error signal exceeds a second predetermined (though possibly adaptively determined) threshold, a collision is said to have occurred on that channel. The normalized error signal (i.e., the summation term in the above equation) can be partially determined from results of the reduced complexity signal presence calculation described above. Specifically, the normalized error signal can be set equal to the absolute value of the optimally sampled despreader output minus the absolute average signal level (determined by scaling the cumulative absolute value computation above). This value can be summed over all despreader output bits to provide additional noise averaging (in order to increase the SNR of the estimate). This method also has the advantage over traditional variance estimation (sum of square of sample minus average value) means in that it does not require costly multiplication operations to determine the presence of signal collisions. The variance measure ($VAR_k$) can also be utilized to detect when signal conditions are poor, and the system spreading gain needs adjustment, as described below.

Those skilled in the art recognize that there are many methods available to detect the presence of a signal, and to detect the presence or absence of collisions, which may vary based on the modulation and signaling type. Collisions may be detected by alternate means, such as standard error detection (e.g., CRC) means, though these methods may not in all cases properly detect collisions (due to falsing). Also note that whether or not collisions occur on a channel, standard error correction means can be employed to correct for transmission errors and improve the accuracy of the signal estimates.

Once again, these signal characterization measurements are typically performed on all of the available (possible) communications channels in a given pass (which may vary with the pass number of the multiple pass algorithm, as described above).

Thus, the reader 100 typically characterizes whether any signal is present on (each and) all of the possible communications channels per pass, and whether a collision has occurred on each channel where signal(s) are present. Recall that a collision is generally defined as when two or more tags utilize the same communications channel during the same pass of the multiple pass algorithm. When a collision occurs on a given channel, the data for that channel is generally lost if no collision mitigation techniques are utilized. If a signal is present on a given channel, and no collisions are detected, the particular signal on that (given) channel is typically said to be successfully received, and the reader 100 generally knows the entire data sequence of that particular tag.

Note that some embodiments may perform error detection or correction (or some other type of signal integrity measure) to ensure that the data is valid and received correctly. Also note that if the tag channel selection data is transmitted, the reader 100 may also check that the tag 110 has indeed communicated on the expected communications channel (serving as another form of error checking for the portion of the data that is used to determine the channel as described above—also see FIG. 18, where the channel selection data 222 for the second pass must match up with the channel choice, as identified with 1820, 1830, 1840).

Once the reader receiver has calculated the above quantities for a given communications pass, it can determine other signal quality measures. Such measures may be utilized for determining when poor channel conditions exist and adjustments need to be made to the system (possibly due to improper signal cancellation conditions, as further described below). Specifically, the SNR of successfully received signals can be estimated by taking the ratio of the average signal level divided by a noise level estimate. The following equation shows an example of this computation, using the above notation and equations, where the average signal level on a single occupied channel has been determined to be ($ABS_s$), and the normalized variance for an unoccupied channel has been determined to be ($VAR_u$):

$$SNR = \frac{ABS_s}{[VAR_u * \sqrt{N_i} * 0.482]}$$

The noise level estimate (0.482 for Gaussian white noise) can be shown to be mathematically related to each unoccupied channel's despreader output as described above. The SNR values for each channel may be averaged over all single occupied channels to get an average SNR measurement. The normalized error (variance) calculation above will generally reflect any impairments on a given channel, and can be used to determine a CIR measurement in a similar manner. For non- or single-occupied channels, the variance measure directly indicates any interference or noise components on channel or in the signal, and for other channels that have two or more users present, the measure can be used as a direct indication of collision severity. These received signal statistics or pass operating parameter measurements can be used to make key system decisions, such as when to adjust the spreading gain for the source devices, as further described below.

Figure 25:
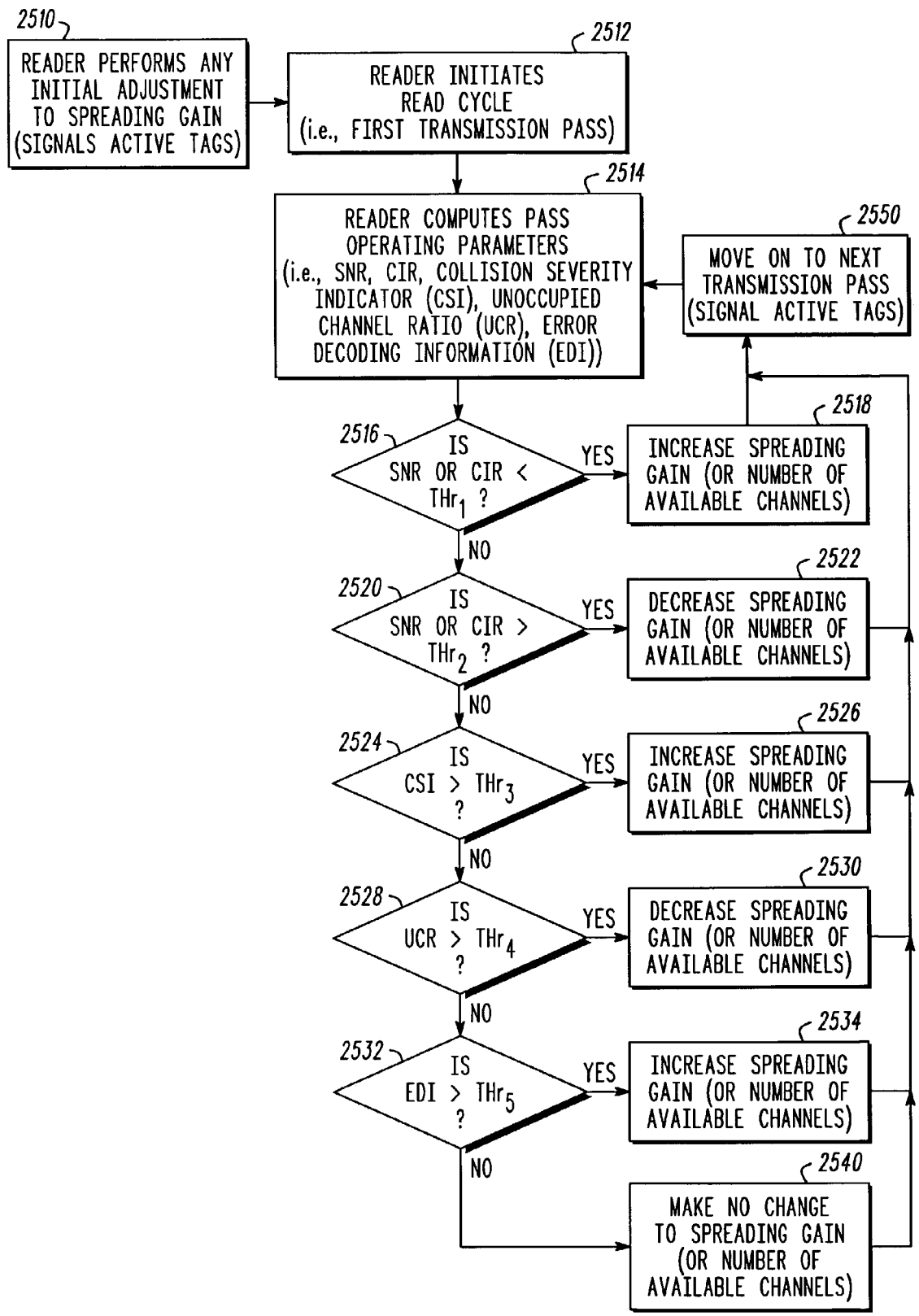
FIG. 25 illustrates an example of a flow diagram for reader processing in accordance with the present invention.

FIG. 25 shows an example of a procedural flowchart for reader processing in accordance with the present invention. Those skilled in the art appreciate that the described processing could take place outside of the reader (at a higher level, possibly in a central controller device), without departing from the spirit of the present invention. The reader device may optionally make an adjustment to the number of available channels before any transmission passes take place based on prior information (e.g., tag population from previous read cycles) as described above. The reader may also abort a current transmission pass (before the entire signal source data sequences are received) if it determines that the signal quality or collision statistics are poor. This approach can be enacted by estimating the above signal source parameters only over a small portion of the data packet (e.g., the first quarter of a packet). In one embodiment of the system, the spreading gain for activated tags may be increased 2518 when the estimated SNR or CIR falls below some threshold 2516 (e.g., $Thr_1$, which can be set to 0 dB for a chip SNR value), or decreased 2522 when it goes above some (possibly different) threshold 2520 (e.g., $Thr_2$, which can be set to 6 dB for a chip SNR value). This action may occur in combination with other measures (e.g., collision severity, etc.). An example of a collision severity indicator (CSI) would be the ratio of channels containing collisions to the total number of available channels in a particular pass of the transmission algorithm. In the preferred embodiment of the invention, when such a ratio exceeds a predetermined value 2524 (e.g., $Thr_3=0.7$), the number of available channels may be increased 2526. Another measure of system loading can be determined from the amount of communications resources (e.g., code phase channels) that are being utilized in the system. Similar to the above ratio measure, if the ratio of unoccupied channels to the total number of available channels (UCR) exceeds another threshold 2528 (e.g., $Thr_4=0.4$), the number of available channels for active tags may be decreased 2530.

The reader may also examine other quantities to determine whether or not to adjust the number of available channels. These may include measures such as CRC status, soft error decoding information, and the like. Similar to the cases above, if many errors are noted from error decoding information (EDI) 2532, the number of available channels may be increased 2534. Note that many of the above quantities are already computed by the reader receiver in the normal course of demodulating data and resolving collisions, so that the impact to reader signal processing is usually not large. Once again, for the purposes of this discussion, increasing the number of available channels is equivalent to increasing the spreading gain, processing gain, or spreading factor in the system. Note that all actively transmitting tags are affected by the change.

Those skilled in the art also recognize that there are a variety of means for deriving similar adaptation information from similar measures, such as adapting the spreading gain based on the severity of collisions (i.e., the actual level of normalized signal variance). Some examples of these measures are further described below. Those skilled in the art also recognize that combinations of the above measures may be utilized to make decisions about adjustments to the number of available channels (e.g., a combination of CIR and error decoding information may cause an adjustment when it passes a threshold). The actual level of such thresholds may also be dynamically adapted. For example, a reader that could afford more time to read a tag population or inventory could alter thresholds that might increase spreading gain (e.g., increase $Thr_1$, decrease $Thr_3$, or decrease $Thr_5$ above) to improve the robustness of the read cycle.

Once the signal from the tag 110 is known (and possibly confirmed), it may be ignored, or removed (as described below) from the rest of the signal population. A form of collision mitigation is implemented if a signal from a particular tag is effectively removed or subtracted from the signal population (through a variety of possible algorithms described below). In this manner, the signal from a known (identified) tag can be removed, thus removing unwanted "interference" from the system. This effectively frees up valuable communications resources. In effect, the entire system is a self-organizing network, where all of the organization is done in the reader receiver instead of the transmitters themselves. Note that the removal of the signal does not have to be exact to realize a benefit from collision mitigation.

Figure 19:
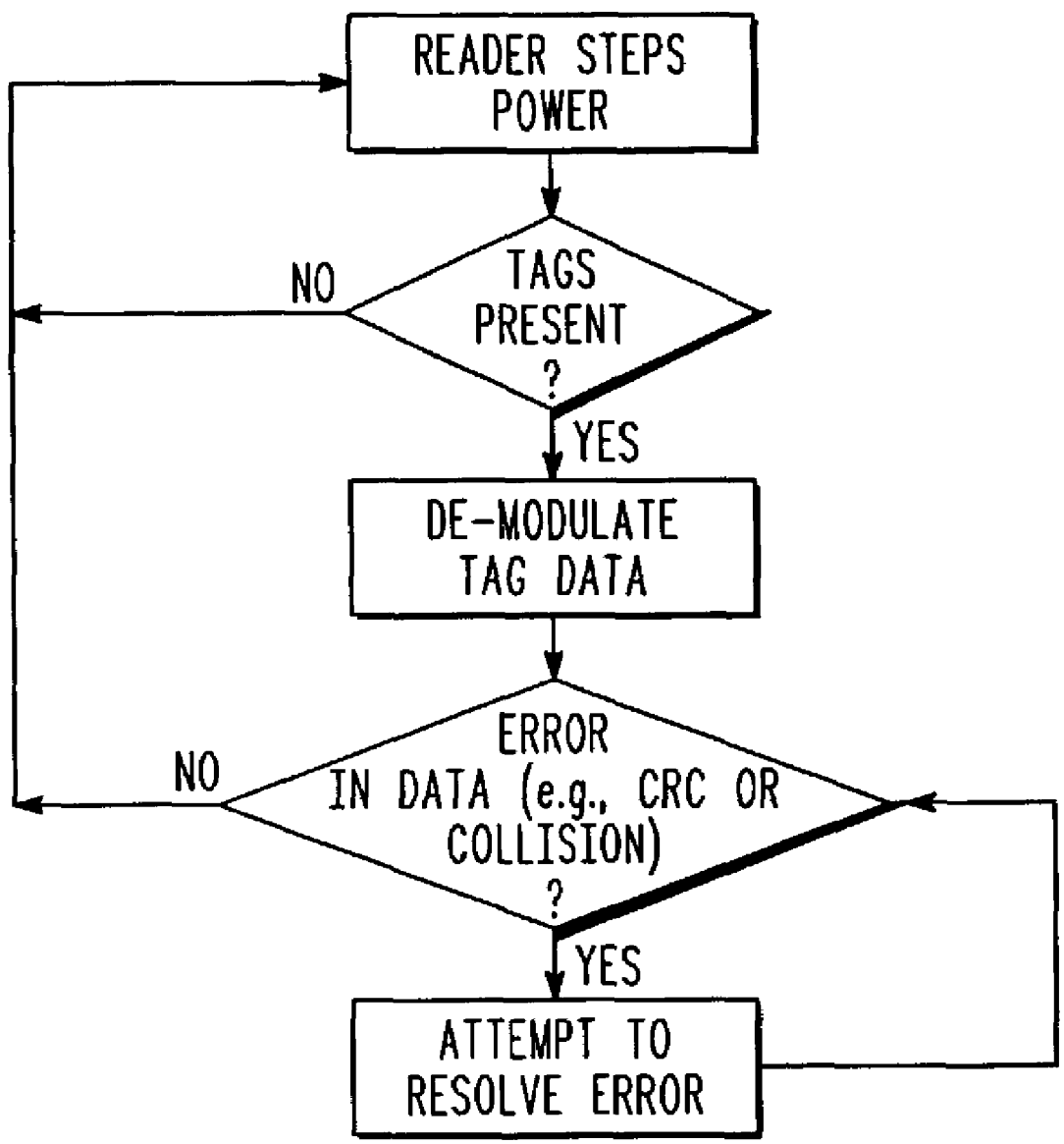
FIG. 19 illustrates a general flowchart for the reader actions in accordance with the present invention.

FIG. 19 shows a general flow chart for reader actions when utilizing collision mitigation techniques. In this case, the reader 100 will attempt to resolve as many collisions (e.g., errors in data) as possible before moving on to the next pass of the multiple pass transmission algorithm (e.g., by holding the reader transmit power constant in the preferred embodiment).

As described above, the reader 100 will generally keep transmitting at a given power level until some confidence level (or probability) is obtained that all actively transmitting tags have been identified.

If the signal is not actively removed (or subtracted) from the signal population (or composite received signal), then no collision mitigation is said to have occurred. In that case, it is possible to use a variety of algorithms in the reader 100 to successfully acquire (or demodulate) all of the data from the tags. The general idea in this case is to wait for each tag to choose a unique (that is, single user occupied) communications channel in at least one of the passes of the multiple pass source device transmission algorithm. This technique is generally the lowest complexity identification method available in the reader 100, though it is also generally the slowest (i.e., requires the longest total transmission time to communicate a piece of information).

One very low complexity algorithm for the case of when no collision mitigation techniques are utilized by the reader 100 is to simply have the tags 110, 120, 130 transmit the maximum number of passes in the multiple pass communications algorithm. The maximum number of passes is typically determined (as described above) when the unique portions of the data stored on the tag is exhausted.

As noted above, the reader 100 directly controls the number of passes that the tags transmit on by controlling the first and second predetermined transmission conditions. In the preferred embodiment of the present invention, the reader transmit power level is held constant in order to continue transmissions among fully activated tags, though other first and second predetermined transmission conditions are possible to control the groups of transmissions from the tags. The maximum number of passes is generally determined by the particular channel selection algorithm, but is partially limited to the data length (in bits) divided by the sum of the channel selection portions of data (in bits) for completely unique (non-overlapping) channel selection choices. Thus, in the example given above with 128 bits of data, and 8 bits of channel ID selection data in each pass, there is a maximum of 16 (i.e., 128/8) communications passes in the multiple pass algorithm (before non-overlapping channel choices start to repeat again). Thus, given a channel (e.g., PN) symbol rate in the preferred embodiment, the maximum interrogation time can be determined, and the total acquisition (or reading) time is fixed for all cases given a required number of transmission passes (as also illustrated in the equations above).

Other (in many cases more complicated) algorithms that use no collision mitigation techniques are also possible. One such alternative is to have the tags 110, 120, 130 transmit for a limited number of passes (less than the maximum), such that a given confidence level is obtained that the received data (or taken tag inventory) is correct. This is generally determined by the expected number of source devices (or tags) present in the system (or at each power-on level), and the desired confidence level (or probability of successfully identifying the items or tags in the system). For instance, with the dynamic channel profile given in the example above, simulations (over 1000 trials) have shown that it takes an average of 7.73 transmission passes to identify 50 tags, though a maximum of 10 passes was required to uniquely identify tags in 1000 trials. Thus, the reader 100 could remain powered up at a given power level for 10 passes to have a reasonable confidence that all of the 50 (or so) tags have successfully transmitted their data on a unique channel. Once again, the reader 100 would only have to be able to determine when there is only one tag 110 on a channel to receive its ID data. This would result in a substantial total acquisition time-savings, since only 10 passes were performed instead of the absolute maximum of 16 passes given in the example above. Further simulations, statistical or probability analysis could be applied to determine other confidence levels or the number of passes for a given number of tags. Note that in some applications, the reader 100 could utilize the maximum number of passes the first time it takes an inventory, and then adjust the number of passes based on the expected (i.e., measured or observed) number of tags present in the system.

Figure 22:
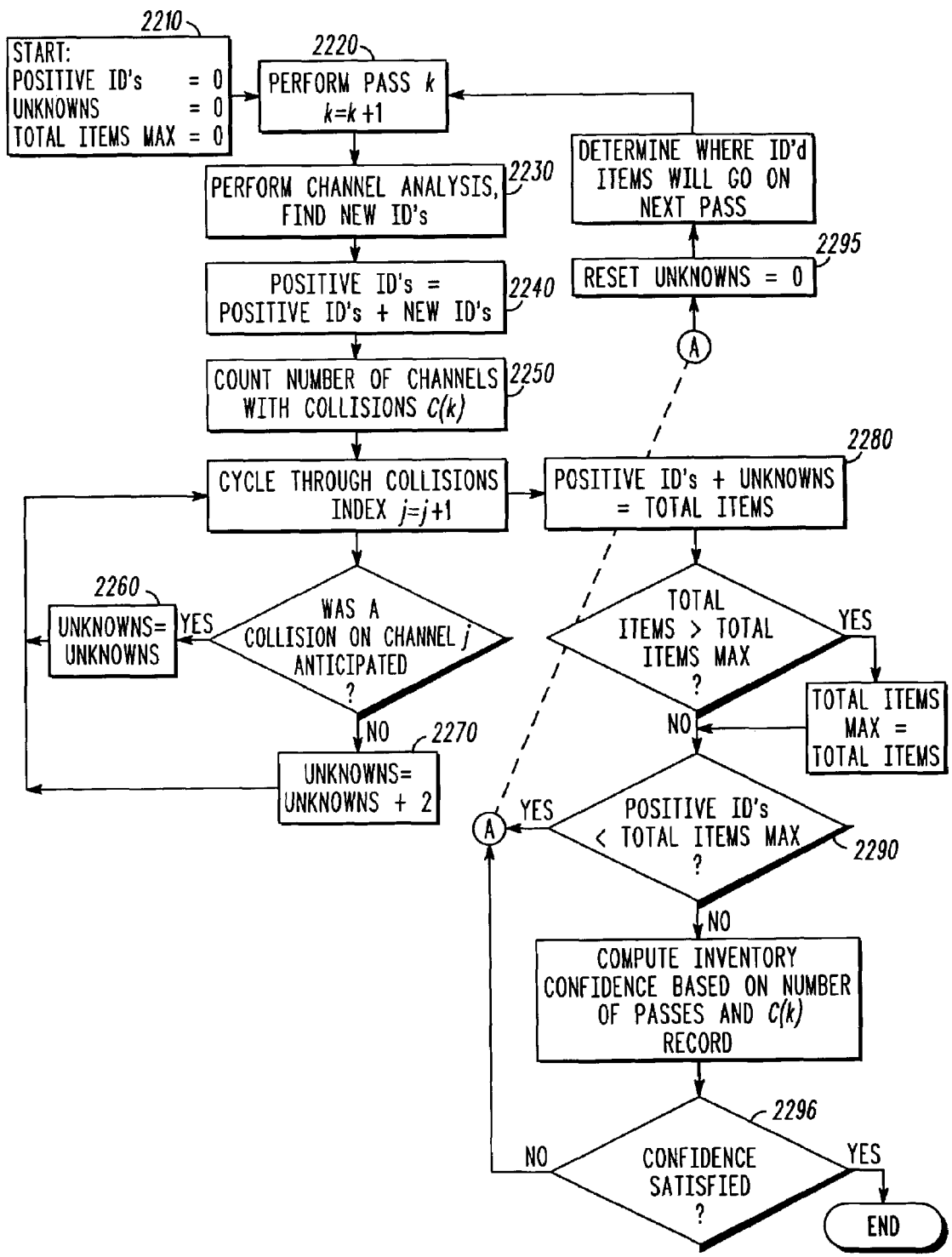
FIG. 22 illustrates an example flowchart of the inventory algorithm when no collision mitigation techniques are applied in accordance with the present invention.

Alternatively, the algorithm used by the reader 100 could keep track of expected collision locations (i.e., channels) for each tag (once its data or ID information has been successfully received), and estimate how many tags are left to be identified in the system. Thus, the reader 100 may be able to stop the interrogation process sooner than the techniques described above (once it determines that no other tags are likely present in the system). In other words, the required number of transmission passes is adaptively estimated by the reader 100 during reception, instead of being pre-computed based on the expected number of tags as described above. This technique is further described in the examples below, and in FIG. 22.

A more advanced embodiment of the reader 100 may utilize any one of several forms of collision mitigation techniques. Collision mitigation techniques generally lessen the impact of collisions on a given communications channel. Ideally, they remove the effects of a particular collision on a channel. This can be accomplished in the described system by (at least conceptually) regenerating a known signal and subtracting the known signal from the total signal population (or composite received signal). Known signals can be considered as interference to other (unknown) signals, thus the described techniques are also known as interference cancellation techniques. Note that this interfering signal subtraction may occur at any stage in the demodulation process (e.g., it may occur at the chip-rate or it may occur after despreading in the preferred embodiment). The preferred embodiment of the present invention performs collision mitigation after despreading in order to reduce the implementation complexity.

Generally speaking, a family of collision mitigation techniques exists of varying levels of complexity, and they are generally more complex (e.g., require more processing power, memory or hardware) than implementations that do not utilize collision mitigation techniques. However, such techniques generally result in much shorter total tag data acquisition (reading) times, and can greatly increase system capacity. Once again, it is assumed that the channel is quasi-static, and the system is relatively linear for best system performance.

In general, the more signals that are known (i.e., successfully determined), the fewer tags appear to be present in the system for a given pass of the multiple pass algorithm, when utilizing collision mitigation techniques. Since the data stored on the tag 110 directly determines the channel selection in the preferred embodiment (or it is otherwise known by the reader 100), once the reader 100 has successfully received the data (generally occurring when the tag 110 transmits on an otherwise unoccupied channel), it knows all of the channel choices that the tag 110 will make for every pass of the multiple pass communications algorithm. Thus, the reader 100 can then predict what channels the tag 110 will utilize for future (and past) transmissions, as above. Note that the observed signal levels from the tag 110 are also generally measured (and low pass filtered) in the reader 100 during the normal signal detection process so a reliable estimate of a given (non-colliding) tag's actual signal strength is available. This knowledge can be utilized to effectively re-create the known signal and accurately subtract it out from the aggregate received signal, thereby removing its effect from other transmission passes.

Specifically, the average signal level (and possibly phase) for each successfully received tag signal can be determined by averaging over some portion of one or more transmission passes. Recall that a tag is successfully received when it transmits on a single occupied channel, in which case its data can be successfully demodulated by traditional means. Once again, in order to simplify processing in the preferred embodiment of the system, the average cumulative absolute value is computed (as in the signal detection stage described above). The average value of the (possibly dc-corrected) absolute signal level on each channel (after despreading) represents the expected signal level for that tag (i.e., a received signal strength). For receivers employing complex data paths (such as those in RF-coupled systems), signal phase may also be averaged over some portion of the transmission pass.

If the channel is quasi-static, or stable over the period of interest (as it often is for short read cycles), the interfering tag's signal level can be assumed to be stable; thus, a locally regenerated form of it can be removed or subtracted from the composite received signal. Since the signal from a successfully received tag is no longer needed or useful (once it data has been determined), removing it frees up communications channels for other unknown tags to communicate on. A known tag's data signal can be recreated by multiplying it's demodulated data symbol or bit sequence with the average expected signal level. The subtraction of this signal can occur after despreading; otherwise, the particular spreading sequence would have to be reapplied if it were to be subtracted before despreading (which is not at all desirable from a computational complexity standpoint). Note that the tag's signal will be known to change channels in each pass of the multiple pass transmission algorithm, which can also be taken into account in the subtraction process. Also note that the number of available channels and spreading codes may change for each pass of the multiple pass algorithm.

Figure 20:
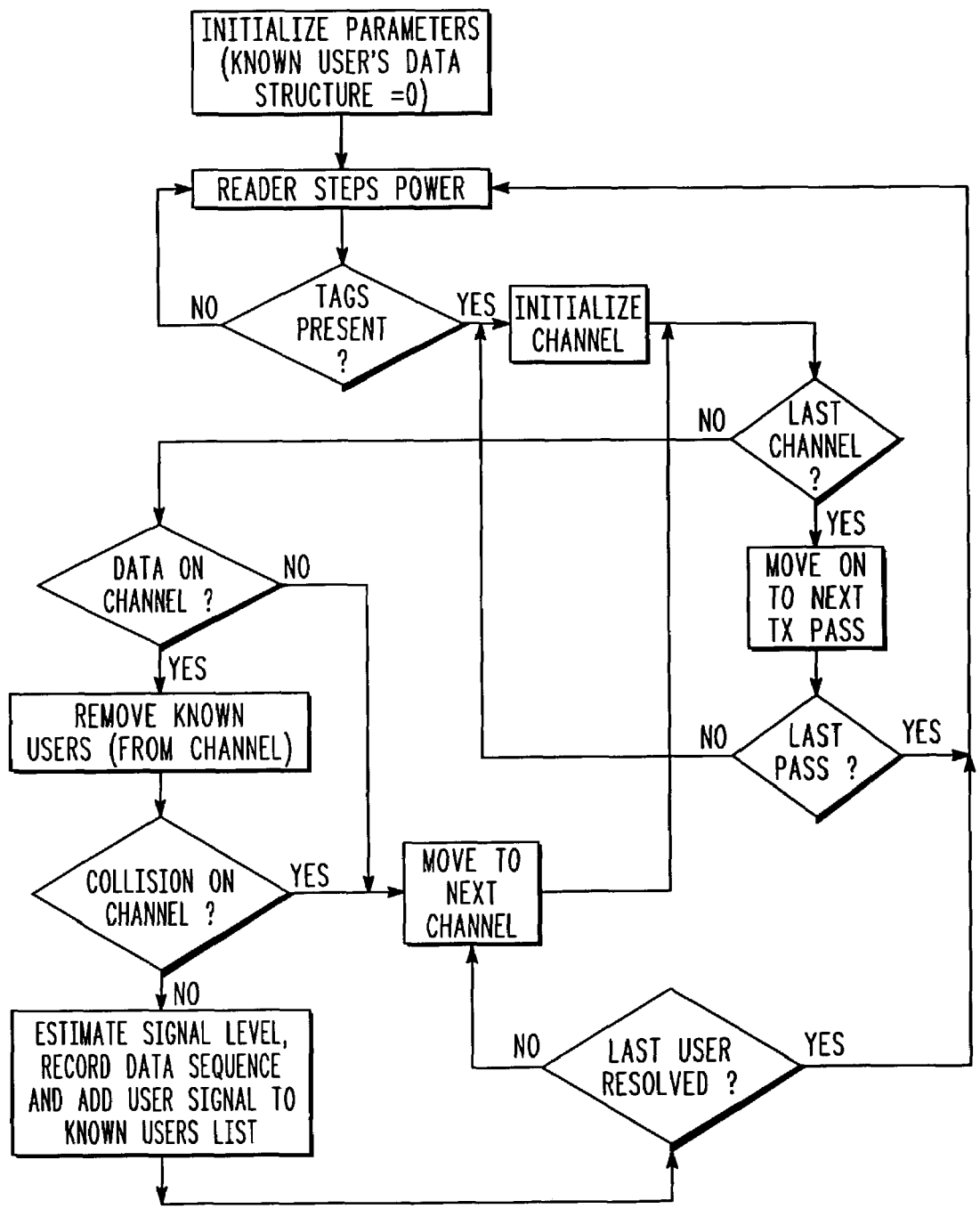
FIG. 20 illustrates a detailed flowchart of a reader processing signals using forward collision mitigation techniques in accordance with the present invention.

A relatively simple form of collision mitigation involves subtracting known signals from subsequent passes of the multiple pass algorithm (in a forward direction with respect to time). Thus, this form of collision mitigation is generally termed forward collision mitigation. FIG. 20 shows an example flow chart for reader processing using forward collision mitigation techniques, where the processing is performed in a sequential (e.g., one channel at a time) fashion in order to ease understanding of the process. The process generally involves determining which tags 110, 120, 130 have successfully transmitted their ID data (as described in the receiver algorithms above), and keeping a data structure (or list) containing known (tags') channel choices and estimated signal levels for each pass of the multiple pass algorithm. Once a tag's ID data and the signal level of a transmitted tag signal are known, it can effectively be removed from any subsequent collisions involving that tag. Note once again, that the signal level can be measured and filtered over increasing lengths of time to obtain increasing levels of accuracy of the interfering signal level. Thus, in one embodiment of the present invention, once a tag signal is estimated (determined within some level of accuracy), it is subtracted out from the proper (pre-determined) channels in later passes of the multiple pass transmission algorithm, negating any interfering effects of that (known) tag's signal on other signals transmitted by other users. This technique is made possible due to the deterministic nature of each tag's channel choices, which are typically based on the data stored on the tag 110.

The quasi-static channel assumption becomes important here since the measured signal level and possibly phase will generally be assumed to hold for all subsequent passes, or at least the current pass of the transmission. In general, the signal level estimates could be updated every transmission pass to account for slowly varying channel conditions. Note that only the known tag signal information (typically contained in a data structure or list) and the composite received signal from the current transmission pass (or burst) needs to be stored to perform this algorithm (as opposed to storing all received bursts in memory as described in the algorithm below). In general, this type of forward collision mitigation algorithm can result in a significant (2–4X) total reading time improvement over methods that do not perform any collision mitigation.

Another more advanced form of collision mitigation involves subtracting known signals from both subsequent and previous passes of the multiple pass transmissions. This is possible because, once the data from a tag 110 is identified, the channels it occupied on previous passes can be ascertained and its contribution to any previous collisions can be nullified. This class of collision mitigation algorithms is generally termed as bi-directional collision mitigation techniques. Bi-directional collision mitigation is more computationally complex (and generally requires more memory to store prior communication passes), but results in greatly reduced total tag reading time (reduced by roughly an order of magnitude over methods that do not perform any collision mitigation).

Generally, this method requires storing a data structure containing known channel choices and estimated signal levels in each communications pass (as in the case above) for identified tags. However, since signals are subtracted out from prior transmission passes (in addition to the current pass as in forward collision mitigation algorithms), additional collisions can be resolved. For example, if data from the third pass of the multiple pass communications algorithm is resolved (i.e., successfully received), it may result in the data from another user being resolvable in a prior pass (e.g., the second pass) of the algorithm, which in turn may free up another user that was previously colliding in either a prior (e.g., the first pass) or subsequent pass (e.g., the third pass) of transmissions. Every time data from a new user is resolved, its reconstructed signal is subtracted from all transmission passes (up to and including the current pass), and the number of channels that are single occupied and those in collisions are evaluated again (for all possible communications channels and passes). In this manner, the reader 100 may cycle through all of the available transmission passes (up to and including the current pass), and resolve more tag signals virtually continuously, until a point is reached where no more users can be resolved in any of the passes (up to and including the current pass). The reader 100 would then step to the next power level and continue with the bi-directional collision mitigation algorithm. The effect can be quite powerful in later transmission passes, allowing a number of tag signals to be resolved which is much greater than the available number of communications channels.

Note that since the spreading gain can change dynamically (per pass), as directed by the reader, it may be necessary to re-normalize signals for a particular spreading factor before subtracting them out from the composite received signal. Also note that the recursive passes of bi-directional interference cancellation may be performed in any order (in time).

Once all of the tag data has been received, the reader 100 may check the integrity of the data via the means mentioned above (e.g., error detection and correction), preferably before any signal cancellation occurs. Traditional data demodulation techniques may be performed based on the type of modulation that is utilized in the tag transmitters. The reader 100 may also post-process the data, which typically includes functions such as descrambling, de-encryption, classification, and removal of redundant items (which power up in more than one power-on range in the preferred embodiment of the present invention). Note that some or all of these functions could take place at a centralized location, thereby serving multiple readers or antennas.

Once a complete read cycle using collision mitigation techniques is finished (i.e., all active tags are identified), the interference characteristics for each signal in the system is known. In particular, the signal amplitude and phase is known (or estimated) for each pass of the multiple pass transmission algorithm, and the data sequence for each active tag present in the system is known. In effect, all information is known about each tag's signal. The complete read cycle is known to take L' transmission passes, which can be associated with a total transaction (read) time, depending on the signaling rate and data payload size, as described in the equations above.

Examples of System Operation

Figure 23:
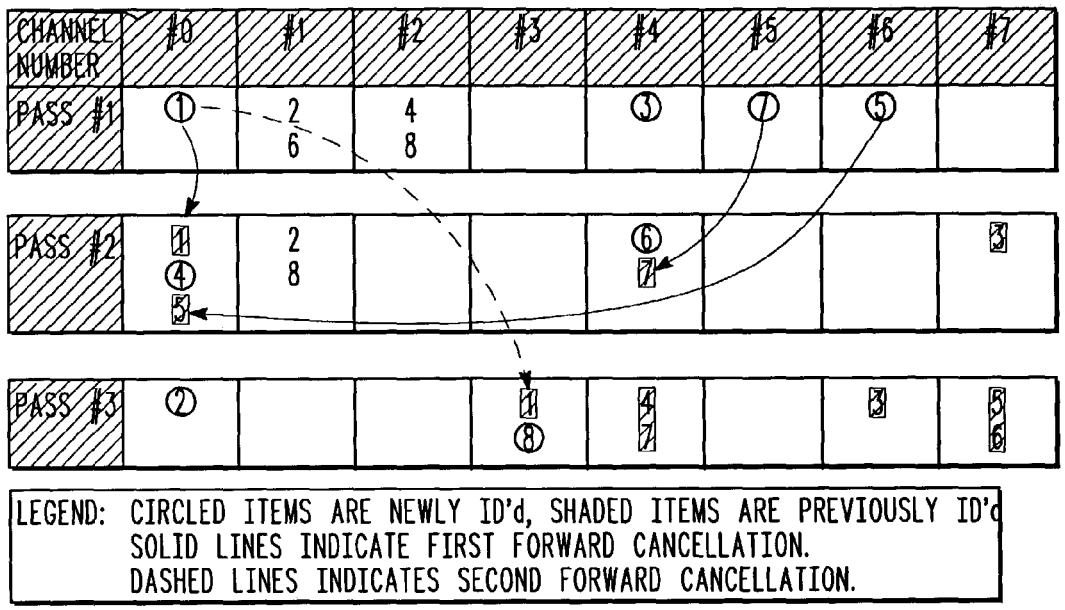
FIG. 23 illustrates an example inventory accounting with forward collision mitigation techniques in accordance with the present invention.
Figure 24:
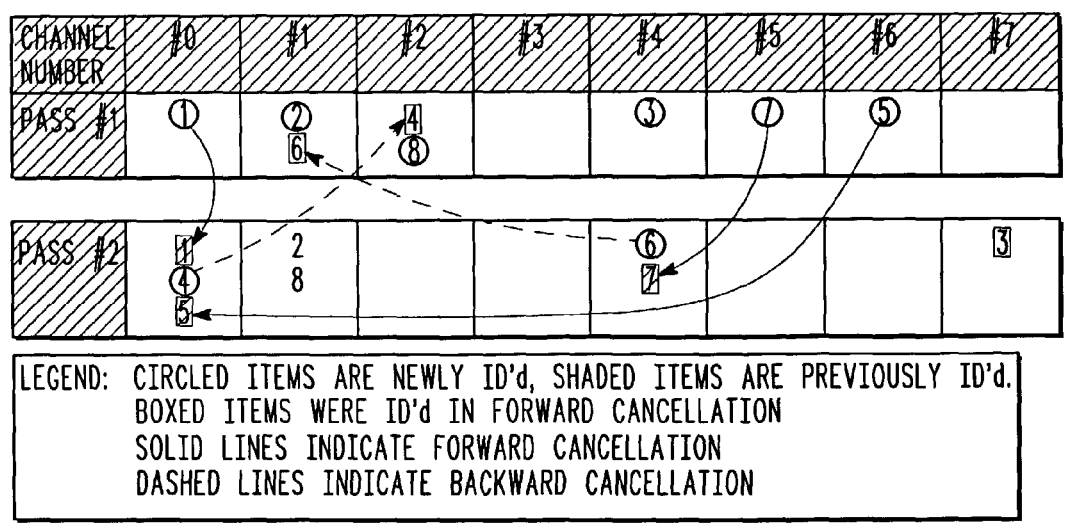
FIG. 24 illustrates an example inventory accounting with bi-directional collision mitigation techniques in accordance with the present invention.

The operation of these algorithms is perhaps best conveyed by way of examples. The examples will detail a simplified, hypothetical system of tags that draw random channels each pass. FIGS. 21, 23, and 24, which will be used to explain the example, are a state diagram of the system, showing which channel each tag picks to communicate over on each subsequent pass through the transmission algorithm. The states in the example are unaltered outputs of an actual experiment using a random number generator to choose the channels. The type of physical channel (e.g., code phase, etc.) is irrelevant at this point. This should provide an accurate model of the overall system due to the data scrambling portion of the present invention as detailed in Section I above.

The example detailed in FIGS. 21, 23 and 24 assumes a population of eight tags, and further assumes a fixed channel size per pass of eight channels from which the tags may draw from to communicate. Thus, three-bits of (e.g., possibly a unique subset of) each tag's ID information is used to select one of eight channels that each tag 110 will transmit on during each pass of transmission in the preferred embodiment. With octal digits, the first thirty bits of the tags ID's were randomly generated and are repeated below for convenience:

Tag 1: 0033 0436 07 . . .

Tag 2: 1106 2551 65 . . .
Tag 3: 4767 4416 41 . . .
Tag 4: 2044 6111 36 . . .
Tag 5: 6072 3355 74 . . .
Tag 6: 1476 5432 40 . . .
Tag 7: 5443 3675 34 . . .
Tag 8: 2135 5115 64 . . .

Tag 1 will choose channel 0 during Pass #1, channel 0 during Pass #2, channel 3 during Pass #3, and so on. Tag 2 will choose channel 1 during Pass #1, channel 1 during Pass #2, channel 0 during Pass #3, and so on. From this list, it can be seen that, for Pass #1, which draws a channel from the first octal digit, tag 1 is the sole occupant of channel 0, tag 3 is the sole occupant of channel 4, tag 5 is the sole occupant of channel 6, and tag 7 is the sole occupant of channel 5. Since there are no collisions in these channels, tags 1, 3, 5, and 7 are successfully identified in their entirety; tags 1, 3, 5 and 7 communicated their full ID in a channel that had no collisions. On Pass #1, however, tags 2 and 6 collided in channel 1, and tags 4 and 8 collided in channel 2. These tags cannot be successfully identified, and will require subsequent passes to be resolved. The reader 100, observing that collisions exist, leaves the power applied at the present level and allows all of the tags to draw another channel from the second octal digit for Pass #2. It should be noted that none of the tags know whether they have successfully communicated their ID information at any stage of the transmission process. Only the reader possesses this knowledge; it will signal the tags when the entire reading process is done by removing the transmission conditions (e.g., powering down).

In Pass #2, the only tag not involved in a collision is tag 3. Since this tag was already identified in Pass #1, the reader 100 did not acquire any new information. None of the tags that were in collisions in Pass #1 can yet be identified. Statistically, for eight tags and eight channels, there is a $1-8!/8^8=99.76\%$ probability that there will be at least one collision. This result comes from the more general case of the probability of no collision between M tags over N channels given above:

$$P\{\text{no collision}\} = \frac{N!}{(N-M)!} \frac{1}{N^M}$$

and the fact that $P\{\text{collision}\}=1-P\{\text{no collision}\}$. There will be this same probability of at least one collision for each pass through the algorithm. For this combination of tags and channels, averaged over 100,000 experiments, 2.7498 of the eight channels are unoccupied per pass, 3.1386 of the channels contain a single tag, 1.5737 channels contain two tags, 0.4482 channels contain 3 tags, 0.0796 channels contain 4 tags, 0.0093 channels contain 5 tags, $7.2\times10^{-4}$ channels contain 6 tags, $4\times10^{-5}$ channels contain 7 tags, and no cases of eight tags in one channel were recorded.

No Collision Mitigation Example

With no collision mitigation, tags have to show up in a channel all by themselves in order to be identified. If the experiment is allowed to run enough times, this will happen. However, with only a limited number of bits in the tag ID 220 information, the experiment may only be run a limited number of times before it starts repeating. For example, if the tag ID was 96 bits long, and three bits per pass were used to draw a channel (one of 8), then after 32 experiments the process would repeat. Since there is a high probability of at least one collision per pass (99.76% for this scenario), there is a small but finite probability that a tag's ID can 'hide' in collisions on each and every pass through the experiment. This does not mean that a tag's ID 220 is identical to a different tag's ID over the entirety (which is not allowed by the assumption of unique tag ID's and a unique, reversible mapping to a scrambled tag ID). All that it means is that the tag's ID 220 is identical to at least one other tag's ID when examined over the small number of bits (in this case, three) being used to define the channel space for that pass. This introduces the concept of inventory or item uncertainty, where an inventory of tags is known only to a certain confidence.

For the example experiment in FIG. 21, eight trials are required for each tag to make an appearance in a collision-free channel. As already mentioned, tags 1, 3, 5 and 7 are identified in Pass #1, tag 2 shows up in Pass #3, tags 4 and 8 are identified in Pass #4, and tag 6 does not show up until Pass #8. Tag 6 is a good example of how a unique tag can be hidden in collisions even though it has a unique ID. If this experiment had only been run through Pass #7 (i.e., if the IDs were only 21 bits long), tag 6 would not have been identified.

In Pass #1, four tags are identified. Two collisions are also identified, indicating that there are at least four other tags (since it takes at least two tags to result in a single collision, it takes at least 4 tags to result in two collisions). So after the first pass, the reader 100 can determine that there are four known tags and at least four unknown tags, or at least eight tags in total.

In Pass #2, only a single, previously known tag is occupying a unique (unused) channel. Since the reader 100 knows the complete ID for tags 1, 3, 5 and 7, it knows what channels these items will be occupying in the next and all subsequent passes. The reader 100 knows that tags 1 and 5 will go to channel 0, and that tag 7 will go to channel 4. The reader 100 thus expects there to be a collision on channel 0, but there is a possibility that there is also an unknown tag that is occupying channel 0 (in this case, tag 4). Channel 0 indicates two known tags and a potential for one or more unknown tags. The reader 100 was not expecting a collision on channel 1 (since none of the known tags were expected to choose that channel). A collision here indicates at least two more unknown tags, with perhaps more. A collision on channel 4, where only tag 7 was expected, indicates at least one other unknown tag. Thus, Pass #2 results in four previously known tags, with at least three (definitely) unknown tags. This is less than the set defined by the first pass, which was four known tags and at least four unknown tags, so the reader 100 gathered no new information in the second pass.

In Pass #3, tag 2 is identified on channel 0. Tag 1 was the only tag expected to go to channel 3, so a collision there indicates at least one unknown tag. Tag 7 was the only item expected to go to channel 4, so a collision there indicates at least two unknown tags (the unknown tag on channel 3 and the unknown tag on channel 4). Tag 3 is again by itself. Tag 5 was the only tag expected to go to channel 7. A collision there indicates at least three unknown tags (counting the unknown tags on channels 3, 4 and 7). These, along with the now five known tags, again indicate at least eight tags.

Pass #4 identifies new tags 4 and 8. Tags 3, 5 and 7 turn up in collision-free channels. Tags 1 and 2 were expected to collide on channel 6, but there may be additional tags there. This leaves seven known tags, and from previous experiments, at least one unknown tag.

Pass #5 identifies no new tags. The collision on channel 5 was unexpected, again indicating seven known tags and at least one unknown tag. Similar interpretations can be made from Pass #6 and Pass #7.

In Pass #8, tag 6 is identified. All other collisions were expected. There are now eight identified tags, the minimum number expected from previous passes. However, there could still be tags hidden in the collisions. For example, there could be a tag that chose channels 1, 0, 4, 6, 3, 1, 1, 5, and this tag would be hidden by other collisions. The probability that a tag would have this particular ID would be $1/8^8$ or $6 \times 10^{-8}$.

There could also be a tag that chose channels e.g., 2, 4, 4, 6, 5, 4, 5, 6, also with probability $6 \times 10^{-8}$. In all, with two collisions during Pass #1, three collisions during Pass #2, three collisions during Pass #3, one collision during Pass #4, two collisions during Pass #5, two collisions during Pass #6, three collisions during Pass #7, and three collisions during Pass #8, there are $2 \times 3 \times 3 \times 1 \times 2 \times 2 \times 3 \times 3 = 648$ possible hidden ID's, each with probability $6 \times 10^{-8}$, for a probability of an additional single hidden tag of $648/8^8 = 38.6 \times 10^{-6}$ (38.6 ppm). The probability of an additional two hidden tags would be even smaller, $648 \cdot 647/8^{16} = 1.5 \times 10^{-9}$. The level of inventory confidence could be further improved in other embodiments by unscrambling the data and determining, for example, that the hidden tag would be associated with a tire or some other unexpected item when all the other items were grocery items.

The probability of a hidden tag can be reduced by allowing the experiment to keep running after it has identified the minimum number of expected tags based on collision information (in this case, 8 tags). By counting the number of collisions per pass, and knowing the probability of a hidden tag based on the number of channels per pass, the reader 100 can keep running passes until it has satisfied some confidence level or has run out of unique channel patterns (exhausted the ID). Assuming $648^{1/8} = 2.246$ collisions per pass, after two additional passes (10 total passes), the probability of a single hidden tag is reduced to $3.04 \times 10^{-6}$. After two more additional passes (12 total), the probability of a single hidden tag is reduced to $240 \times 10^{-9}$. Each additional pass reduces the probability of a single hidden tag as a geometric progression by roughly $648^{1/8}/8 = 0.281X$.

A flow chart showing the steps involved in the no-interference cancellation method described above appears in FIG. 22. At the start 2210, the system is initialized with no positive ID's and no unknowns, which together corresponds to a total of zero items. After the analysis 2230 of the first pass 2220, positive ID's (e.g., items 1, 3, 5 and 7 in Pass #1) are recorded and added 2240 to the list of positive ID's. The number of collisions in the pass 2250 is also recorded (e.g., two collisions in Pass #1). If the collisions were anticipated 2260, then there are potential unknowns that may be revealed in future passes but no definite unknowns. If the collisions were not anticipated 2270, the two unknowns are added to the unknown list. The total number of items is then estimated 2280 to be the positively identified items and the minimum number of unknowns that could cause the recorded collisions. Assuming the positive ID's do not equal the estimated total items, the unknowns total is reset to zero 2295 and another pass 2220 is initiated. The loop is finally exited 2290 when the number of positive ID's equals the maximum number of previously identified ID's plus unknowns, and a predetermined confidence level 2296 is satisfied.

So far, no assumptions have been made about the time variations of the channel and the received signal levels. The "no collision mitigation method" can be applied whether the channel is static or dynamic. For the case of static channel conditions, where the return signals have a consistent power level and phase, more information is available at the reader 100 in the form of received signal level. If it is now assumed that, in addition to knowing what channel a known tag will choose on future passes, its signal level is also known, then it can be determined whether there are additional hidden tags in expected collisions. For example, the collision on channel 0 during Pass #2 contained two known tags and one unknown tag. If the signal levels of the known tags were also known, then the total signal level of the collision could be compared to the individual signal levels to determine if there was an additional unknown tag concealed in the collision. Such an environment would allow the reader 100 to terminate its inquiry after all tags had been independently identified (in this case, 8 passes) with certainty that there were no hidden tags because all collisions would be accounted for.

Knowledge of the signal level of identified tags thus offers a greater confidence in the accounting of the inventory. However, the signal level information affords improvements in acquisition time beyond merely terminating the inquiry after all known tags appear individually. This is discussed in the next section.

Forward Collision Mitigation Example

When a tag is individually identified, its channel choices for all subsequent passes are known at the reader 100. If the signal level and phase of the tag are additionally known, then the contributions of that tag to collisions can be nullified. The signal from the tag can essentially be removed from subsequent collisions, thereby effectively removing it from the population. Consider the experiment shown in FIG. 23. Tags 1, 3, 5 and 7 are positively identified during Pass #1. Assume their signal levels and phases are also determined.

During Pass #2, tags 1 and 5 are known to transmit their data over channel 0. With their known signal level, they can be subtracted out, leaving behind only tag 4 that can now be identified. Likewise, tag 7 was expected to transmit its data over channel 4 during Pass #2, and by canceling out this tag, tag 6 is left alone to be identified. There is still an unresolved collision on channel 1, so at least one other pass through the algorithm is required.

During Pass #3, tag 2 shows up by itself and is identified. Tag 1 was expected to transmit its data over channel 3, so it is subtracted out, leaving behind only tag 8, which can now be identified. All other collisions contain only known tags, so the accounting of the tags has been completed in three passes through the algorithm with full confidence instead of eight or more passes (depending on the confidence level required) for no collision mitigation as in FIG. 21.

For a coherent static channel, the signal strength of identified tags can be known to a high precision. Consider the case of an augmented PN channel. For this experiment, the tags would choose different code phases of an eight-chip long augmented PN sequence. This eight-chip long PN sequence would be transmitted either true or inverted for each bit of the tag's ID, depending on the sense of the particular ID bit. At the reader 100, the correlator in the receiver would essentially average the signal level over the eight chips per bit. This would be done for all bits (e.g., 128) in the ID, giving an average over $8 \times 128 = 1024$ samples, for a signal to noise ratio averaging gain of $10 \log (1024) = 30$ dB. For more practical cases where there are many more expected tags and many more channels available (>32), the gain increases. For 32 channels and 128 bits, a gain in signal-to-noise ratio of 36 dB results.

Bi-Directional Collision Mitigation Example

Even greater improvements in accounting time can be made if the reader 100 stores waveform samples from previous passes. With a stored waveform, previous passes can be revisited and treated as subsequent passes, from which previous collisions can be cancelled out. This is because once a tag is identified, not only are all subsequent activities known, but all previous channel choices and signal levels would also be known.

Consider the example shown in FIG. 24. During Pass #1, tags 1, 3, 5 and 7 are identified in both bit pattern and signal level and phase. As with forward collision mitigation, tag 4 can be identified in Pass #2 since the effects of tags 1 and 5 can be removed from the collision on channel 0. Likewise, removing the effects of tag 7 from the collision on channel 4 allows identification of tag 6. After Pass #2 and the application of forward collision mitigation, tags 1, 3, 4, 5, 6 and 7 are known.

Instead of needing the third pass, the results of Pass #1 may be revisited after applying forward collision mitigation. With tag 4 identified during Pass #2, it can be removed from channel 2 of the stored results of the first pass to resolve tag 8. With tag 6 identified during Pass #2, it can also be removed from channel 1 of the stored results of the first pass to resolve tag 2. In this case, only two passes are required to successfully identify all eight tags. The benefits of both forward and bi-directional collision mitigation become more significant when larger numbers of channels and tags are involved.

Thus, a one-way communications system utilizing a multiple pass transmission algorithm (preferably employing spread spectrum techniques) that offers superior performance (e.g., reading time and capacity) has been fully described. The incorporation of collision mitigation techniques, dynamic channel profiles, and power on ranges further improves system performance. The described communication system has many applications that are not limited to the preferred embodiment and actual examples detailed in the text. The present invention also has applications in two-way communications devices, actively powered user devices, and networked devices without departing from its essential characteristics (described in the claims below).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method of dynamically adapting the number of available channels in a set of available data transmission channels for use by at least one source device to transmit stored information to a destination device, said method comprising the steps of:
    computing, at the destination device, at least one received signal statistic;
    determining, at the destination device, an adjustment to the number of available channels in said set based on said at least one computed received signal statistic;
    sending a signal from the destination device to the at least one source device indicating the adjusted number of available data transmission channels for transmitting the stored information; and
    independently selecting, at the source device, a data transmission channel from the adjusted number of available data transmission channels for transmitting the stored information according to a multiple pass transmission algorithm having at least one transmission pass, wherein the data transmission channel is selected based at least in part on the stored information, and wherein the step of sending the signal from the destination device to the at least one source device is at least one of performed at the beginning of and performed during a transmission pass in the multiple pass transmission algorithm.

2. The method of claim 1, wherein said at least one received signal statistic further comprises a measure of system loading.

3. The method of claim 2, wherein the measure of system loading is computed from a collision severity indicator.

4. The method of claim 3, wherein the collision severity indicator is determined by a ratio of a number of channels determined to be in collision to the total number of available channels.

5. The method of claim 3, wherein the collision severity indicator is determined by a measure of a signal variance on a channel containing collisions.

6. The method of claim 2, wherein the measure of system loading is computed from an unoccupied channel indicator.

7. The method of claim 1, wherein the at least one computed received signal statistic comprises at least one of a received signal carrier to interference ratio (CIR), a received signal to noise ratio (SNR), and a measure of transmission errors.

8. The method of claim 7, wherein the measure of transmission errors is computed from a bit error indicator.

9. The method of claim 7, wherein the measure of transmission errors is computed as determined by a cyclic redundancy check (CRC).

10. The method of claim 7, wherein the measure of transmission errors is computed from soft error decoding information.

11. The method of claim 7, wherein the measure of transmission errors is computed as determined during forward error correction (FEC).

12. The method of claim 1, wherein the data transmission channel is selected based directly on a predetermined subset of the stored information.

13. The method of claim 1, wherein the adjustment to the number of available channels is determined when a received signal statistic crosses a threshold.

14. The method of claim 1, wherein the adjustment to the number of available channels is determined to minimize an overall data transmission time.

15. The method of claim 1, wherein the step of determining the adjustment to the number of available channels and the step of signaling data to each active signal source in the system is performed prior to said signal sources transmitting signals.

16. The method of claim 1, wherein said at least one received signal statistic is computed using information gathered during a prior signal source transmission.

17. The method of claim 1, wherein said at least one received signal statistic is computed based on an expected number of signal sources present in the system.

18. The method of claim 1, wherein the number of available channels in said set is adjusted by increasing said available channels by a fixed amount.

19. The method of claim 1, wherein the number of available channels in said set is adjusted by decreasing said available channels by a fixed amount.

20. The method of claim 1, wherein said signaling represents a total number of available data transmission channels for transmitting signals based on the adjustment to said set.

21. The method of claim 1, wherein said signaling represents only the adjustment to said set of available data transmission channels.

22. The method of claim 1, wherein the step of signaling to each active signal source in the system is performed via pulse width modulation.

23. The method of claim 1, wherein said signal sources transmit according to a spread spectrum technique.

24. A communications system comprising:
- at least one source device having stored identification data, a signal source, and a channel selector, the signal source adapted for transmitting at least part of the identification data in an active state over a data transmission channel, the channel selector adapted for independently choosing at the source device the data transmission channel from an adjusted number of available data transmission channels based directly on a predetermined subset of the stored identification data; and
- at least one destination device adapted for computing at least one received signal statistic based on a measure of a number of unoccupied channels, determining the adjusted number of available data transmission channels from a first set of available data transmission channels based on said at least one computed received signal statistic, and signaling to each active signal source in the system to cause the signal sources to use the adjusted number of available data transmission channels for transmitting the identification data.

25. The system of claim 24, wherein said signal sources transmit stored identification data according to a multiple pass transmission algorithm having at least one transmission pass.

26. The system of claim 24, wherein the number of available channels is the same for all active signal sources.

27. The system of claim 24, wherein said at least one destination device signals to each said active signal source via pulse width modulation.

28. The system of claim 24, wherein said at least one destination device is further adapted such that said signaling further causes the signal sources to be synchronized for transmitting signals using the adjusted number of available channels.

29. The system of claim 24, wherein the at least one computed received signal statistic comprises at least one of a received signal carrier to interference ratio (CIR), a received signal to noise ratio (SNR), a computation based on a measure of severity of collisions and a computation based on error decoding information.

* * * * *